United States Patent
Kumar et al.

(10) Patent No.: US 9,783,678 B2
(45) Date of Patent: Oct. 10, 2017

(54) HIGH DENSITY MEMBRANE PROTEIN MEMBRANES

(71) Applicants: The Penn State Research Foundation, University Park, PA (US); President and Fellows of Harvard College, Cambridge, MA (US)

(72) Inventors: Manish Kumar, State College, PA (US); Thomas Walz, New York, NY (US)

(73) Assignees: The Penn State Research Foundation, University Park, PA (US); President and Fellows of Harvard College, Cambridge, MA (US)

(*) Notice: Subject to any disclaimer, the term of this patent is extended or adjusted under 35 U.S.C. 154(b) by 0 days.

(21) Appl. No.: 15/005,382

(22) Filed: Jan. 25, 2016

(65) Prior Publication Data
US 2016/0199785 A1    Jul. 14, 2016

Related U.S. Application Data

(63) Continuation of application No. 13/969,939, filed on Aug. 19, 2013, now abandoned.

(Continued)

(51) Int. Cl.
*C08L 89/00*    (2006.01)
*B01D 67/00*    (2006.01)
(Continued)

(52) U.S. Cl.
CPC .......... *C08L 89/00* (2013.01); *B01D 67/0009* (2013.01); *B01D 71/74* (2013.01);
(Continued)

(58) Field of Classification Search
CPC .......... C08L 89/00; B01D 71/74; B01D 71/80; B01D 2323/12; C08H 1/00
See application file for complete search history.

(56) References Cited

U.S. PATENT DOCUMENTS

| 8,378,003 B2 * | 2/2013 | Manish | B01D 67/0006 210/500.1 |
| 2011/0046074 A1 * | 2/2011 | Kumar | B01D 67/0006 514/21.2 |
| 2012/0129270 A1 | 5/2012 | Nallani et al. | |

FOREIGN PATENT DOCUMENTS

| DK | WO 2013043118 A1 * | 3/2013 | ......... B01D 67/0006 |
| WO | 2009076174 | 6/2009 | |
| WO | 2010123462 | 10/2010 | |

OTHER PUBLICATIONS

Yang, Baoxue, et al. "Carbon dioxide permeability of aquaporin-1 measured in erythrocytes and lung of aquaporin-1 null mice and in reconstituted proteoliposomes." Journal of Biological Chemistry 275.4 (2000): 2686-2692.*

(Continued)

*Primary Examiner* — Nicholas Hill
(74) *Attorney, Agent, or Firm* — Buchanan Ingersoll & Rooney PC

(57) ABSTRACT

Embodiments of the invention provide methods for preparing high density membrane protein membranes by slow, controlled removal of detergent from mixtures of detergent, block copolymers and membrane protein mixtures. Membranes created by this method are also provided. The structure of these membranes may be varied by varying the amount of membrane protein.

20 Claims, 12 Drawing Sheets

Related U.S. Application Data

Figure 2A:
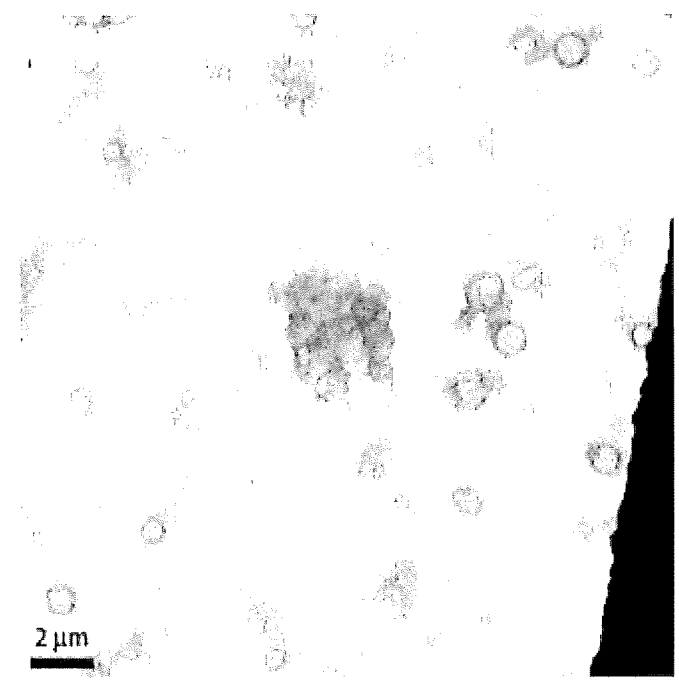

(60) Provisional application No. 61/684,410, filed on Aug. 17, 2012.

(51) Int. Cl.
  B01D 71/74 (2006.01)
  B01D 71/80 (2006.01)
  C08H 1/00 (2006.01)

(52) U.S. Cl.
  CPC .............. B01D 71/80 (2013.01); C08H 1/00 (2013.01); *B01D 2323/12* (2013.01)

(56) References Cited

OTHER PUBLICATIONS

Rémigy, H-W., et al. "Membrane protein reconstitution and crystallization by controlled dilution." FEBS letters 555.1 (2003): 160-169.*

Gu, L. et al., Stochastic Sensing of Organic Analytes by a Pore-Forming Protein Containing a Molecular Adapter, Nature 1999, 398, 686-690.

Astier, Y. et al., Protein Components for Nanodevices, Curr. Opin. Chem. Biol. 2005, 9, 576-584.

Suzuki, H. et al., Planar Lipid Bilayer Reconstitution With a Micro-Fluidic System, S. Lab. Chip 2004, 4, 502-505.

Kumar, M. et al., Highly Permeable Polymeric Membranes Based on the Incorporation of the Functional Water Channel Protein Aquaporin Z, W. Proc. Natl. Acad. Sci. USA 2007, 104, 20719-20724.

Taubert, A. et al., Self-Assembly of Reactive Amphiphilic Block Copolymers as Mimetics for Biological Membranes, Curr. Opin. Chem. Biol. 2004, 8, 598-603.

Discher, B. et al., Polymersomes: Tough Vesicles Made From Diblock Copolymers, Science 1999, 284, 1143-1146.

Discher, D. E. et al., Polymer Vesicles, Science 2002, 297, 967-973.

Grzelakowski, M. et al., Immobilized Protein-Polymer Nanoreactors, Small 2009, 5, 2545-2548.

Egli, S. et al., Biocompatible Functionalization of Polymersome Surfaces: A New Approach to Surface Immobilization and Cell Targeting Using Polymersomes, J. Am. Chem. Soc. 2011, 133, 4476-4483.

Nardin, C. et al., Polymerized ABA Triblock Copolymer Vesicles, Langmuir 2000, 16, 1035-1041.

Peer, D. et al., Nanocarriers as an Emerging Platform for Cancer Therapy, Nature Nanotech. 2007, 2, 751-760.

Kita-Tokarczyk, K. et al., Block Copolymer Vesicles—Using Concepts From Polymer Chemistry to Mimic Biomembranes, Polymer 2005, 46, 3540-3563.

Ho, D. et al., Fabrication of Biofunctional Nanomaterials via *Escherichia coli* OmpF Protein Air/Water Interface Insertion/Integration With Copolymeric Amphiphiles, Nanomedicine 2006, 2, 103-112.

Gonzalez-Perez, A. et al., Biomimetic Triblock Copolymer Membrane Arrays: A Stable Template for Functional Membrane Proteins, Langmuir 2009, 25, 10447-10450.

Langer, R., New Methods of Drug Delivery, Science 1990, 249, 1527-1533.

Mueller, P. et al., Methods for the Formation of Single Bimolecular Lipid Membranes in Aqueous Solution, J. Phys. Chem. 2011, 67, 534-535.

Gonen, T. et al., Lipid-Protein Interactions in Double-Layered Two-Dimensional AQPO Crystals, Nature 2005, 438, 633-638.

Ohi, M. et al., Negative Staining and Image Classification—Powerful Tools in Modem Electron Microscopy, Biol Proced Online 2004, 6, 23-34.

Mashl, R. J. et al., Molecular Simulation of Dioleoylphosphatidylcholine Lipid Bilayers at Differing Levels of Hydration, Biophys J., 2001, 81, 3005-3015.

Bayley, H. et al., Stochastic Sensors Inspired by Biology, Nature 2001, 413, 226-230.

Zhang, L. et al., Multiple Morphologies of "Crew-Cut" Aggregates of Polystyrene-b-poly(acrylic acid) Block Copolymers, Science 1995, 268, 1728-1731.

Dorn, J. et al., Planar Block Copolymer Membranes by Vesicle Spreading, Macromol, Biosci, 2011, 11, 514-525.

\* cited by examiner

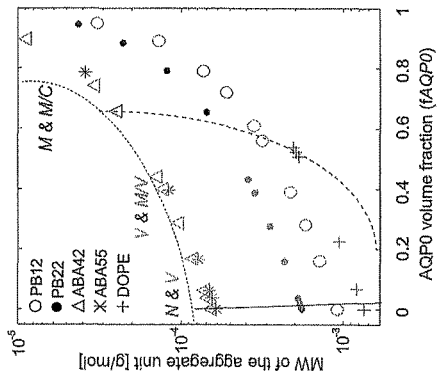
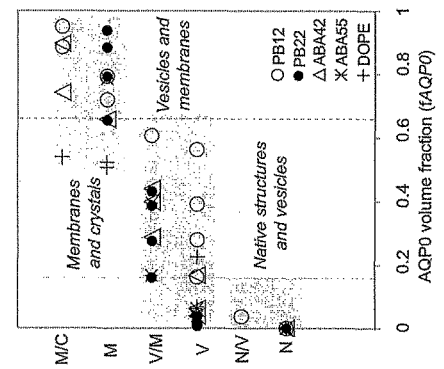
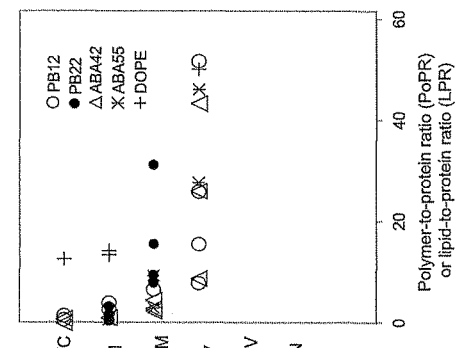
Fig. 1A
Fig. 1B
Fig. 1C

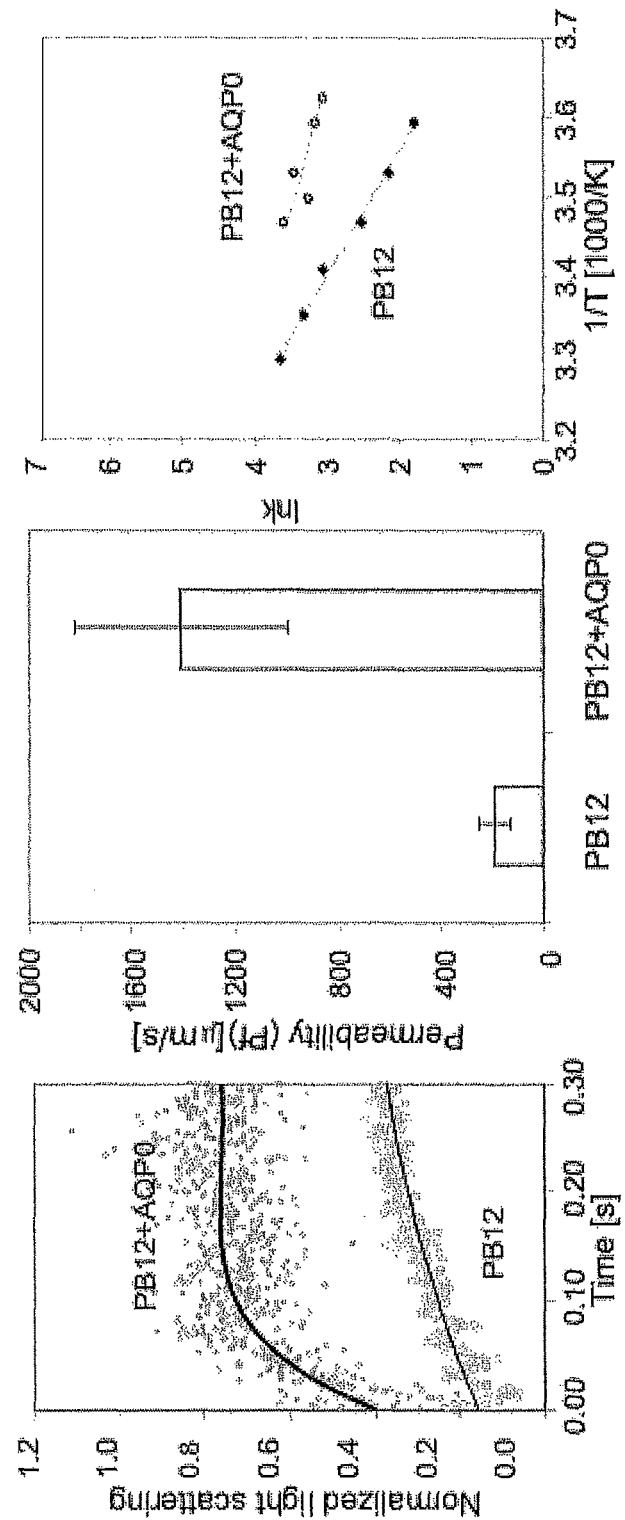

HIGH DENSITY MEMBRANE PROTEIN MEMBRANES

CROSS-REFERENCE TO RELATED APPLICATIONS

This application is a continuation of U.S. Utility patent application Ser. No. 13/969,939, filed Aug. 19, 2013, which claims priority to U.S. Provisional Patent Application No. 61/684,410, filed on Aug. 17, 2012, wherein both applications are incorporated by reference herein in their entirety.

STATEMENT REGARDING FEDERALLY SPONSORED RESEARCH OR DEVELOPMENT

None.

BACKGROUND OF THE INVENTION

Field of the Invention

Embodiments of the invention relate to high density membranes comprising block copolymers and membrane proteins. Further embodiments of the invention include methods for production of such membranes.

Description of the Related Art

Membrane proteins mediate specific and efficient transport of water, ions and solutes across cell membranes. They also serve the cell as sensors that detect environmental conditions, ranging from pH to specific signaling molecules and toxins.

Incorporating such membrane proteins into stable membranes formed by lipids and lipid analogs could provide materials with targeted applications in sensors, enzymatic reactions, drug screening, and even water purification. See Gu, L.; Braha, O.; Conlan, S.; Cheley, S.; Bayley, H. *Nature* 1999, 398, 686-690; Bayley, H.; Cremer, P. S. *Nature* 2001, 413, 226-230; Astier, Y.; Bayley, H.; Howorka, S. *Curr. Opin. Chem. Biol.* 2005, 9, 576-584; Suzuki, H.; Tabata, K.; Kato-Yamada, Y.; Noji, H.; Takeuchi, S. *Lab. Chip* 2004, 4, 502-505; and Kumar, M.; Grzelakowski, M; Zilles, J.; Clark, M.; Meier, W. *Proc. Natl. Acad. Sci. USA* 2007, 104, 20719-20724. Block copolymers (BCPs) form membranes that mimic the architecture of lipid bilayers and allow incorporation of functional membrane proteins. See Taubert, A.; Napoli, A.; Meier, W. *Curr. Opin. Chem. Biol.* 2004, 8, 598-603.

In contrast to lipids, BCPs can be tailored to have the stability and durability associated with polymeric materials and hence are more suitable for the production of membrane protein-based devices and other applications. See Discher, B.; Won, Y.; Ege, D.; Lee, J.; Bates, F.; Discher, D.; Hammer, D. *Science* 1999, 284, 1143-1146. Furthermore, BCPs can be designed to form membranes with specific physical properties and unique morphologies simply by the choice of the blocks and their lengths or their length ratio. See Discher, D. E.; Eisenberg, A. *Science* 2002, 297, 967-973; Zhang, L.; Eisenberg, A. *Science* 1995, 268, 1728-1731. Physical properties that can be engineered include the toughness and permeability of the membrane, as well as its morphology (e.g., micellar, vesicular, cylindrical or planar). BCP end groups can also be modified by molecules such as biotin and 4-formylbenzoate (for recognition and immobilization), methacrylate (for stabilization by crosslinking), fluorescent molecules (for imaging), and even drugs (for drug delivery). See Grzelakowski, M.; Onaca, O.; Rigler, P.; Kumar, M.; Meier, W. *Small* 2009, 5, 2545-2548; Egli, S.; Nussbaumer, M. G.; Balasubramanian, V.; Chami, M.; Bruns, N.; Palivan, C.; Meier, W. *J. Am. Chem. Soc.* 2011, 133, 4476-4483; Nardin, C.; Hirt, T.; Leukel, J.; Meier, W. *Langmuir* 2000, 16, 1035-1041; and Peer, D.; Karp, J. M.; Hong, S.; Farokhzad, O. C.; Margalit, R.; Langer, R. *Nature Nanotech.* 2007, 2, 751-760.

Recent efforts to insert membrane proteins into BCP membranes resulted in the incorporation of only a small number of proteins into either vesicles or painted, supported, or suspended bilayers. See Kita-Tokarczyk, K.; Grumelard, J.; Haefele, T.; Meier, W. *Polymer* 2005, 46, 3540-3563; Ho, D.; Chang, S.; Montemagno, C. D. *Nanomedicine* 2006, 2, 103-112; and Gonzalez-Perez, A.; Stibius, K. B.; Vissing, T.; Nielsen, C. H.; Mouritsen, O. G. *Langmuir* 2009, 25, 10447-10450. While vesicles are excellent vectors for drug delivery, other applications such as sensors, reactive surfaces, drug screening, and water purification would benefit greatly from a planar membrane morphology. See Langer, R. *Science* 1990, 249, 1527-1533. Also, film rehydration, a technique commonly used to make polymer-protein vesicles, appears to limit the amount of membrane protein that can be incorporated into BCP vesicles, even if high protein concentrations are used. Painted bilayers are excellent tools for studying the function, in particular the conductance, of membrane proteins, but the number of membrane proteins that are incorporated is usually low, and the stability of the membrane can be limited due to the presence of residual solvent. See Mueller, P.; Rudin, D. O.; Tien, H. T.; Wescott, W. C. *J. Phys. Chem.* 2011, 67, 534-535. Supported and suspended bilayers have also shown low reconstitution of membrane proteins.

BRIEF SUMMARY OF THE INVENTION

We have found that high density protein membranes including membrane protein two dimensional crystals may be formed from amphiphilic block copolymers and proteins using slow, controlled detergent removal. In preferred embodiments the slow, controlled detergent removal may be achieved through dialysis. This was accomplished even though BCPs typically have low detergent solubility and significant propensity to form aggregates even in high detergent concentrations. Using methods as presented herein, membrane proteins can be functionally incorporated into BCP membranes at high density. Incorporation of membrane proteins affects the morphology of the resulting BCP-membrane protein aggregates. In each case this may be accomplished through slow, careful removal of detergent.

In selected embodiments the effect of protein AQP0 on the morphology of self-assembled structures for all four BCPs and one lipid tested followed similar trends depending on the volume fraction occupied by AQP0. Furthermore, in some cases, AQP0 formed 2D crystals in BCP membranes, representing the limit of membrane protein packing in bilayer-like membranes. We also show such crystals with the bacterial membrane protein, outer membrane protein F (OmpF) as well the cyanobacterial photosynthetic protein, Photosystem I (PSI). Of course, those skilled in the art will recognize that "2D crystals" does not imply that the resulting sheets have absolutely no thickness; instead, they may have a thickness of only a single protein.

Concentration-dependent morphology evolution allows for the design of membrane protein devices and membranes of defined form factor, and the high densities shown possible to be achieved provides for orders of magnitude improvement in sensitivity or transport rates of such devices, allowing for miniaturization or other unique designs.

Embodiments of the invention provide, for example, a method for preparing a block copolymer/protein membrane, including preparing a mixture including at least one block copolymer, at least one detergent, and at least one protein, wherein said block copolymer is solubilized in the detergent; removing the detergent at a slow, controlled rate from said mixture until the concentration of detergent is below the mixture's critical micelle concentration; optionally removing additional detergent, either in the same or a different way that detergent was removed at a slow, controlled rate from the mixture; and forming a membrane comprising the block copolymer and the membrane protein at high density representing a molar polymer to protein ratio of 0.2-20.

In some embodiments the mixture has a polymer to protein molar ratio of between 0.2 and 100. In further embodiments the detergent concentration is at least 5% wt/volume. The polymer to protein molar ratio of the mixture may also be is between 0.2 and 40.

In some embodiments the block copolymer is an amphiphilic diblock or triblock block copolymer comprising one or more hydrophobic blocks selected from the group consisting of polybutadiene (PB), polydimethylsiloxane (PDMS), polypropylene (PP), polypropylene oxide (PPO), polyethylethylene (PEE), polyisobutylene (PIB), polyisoprene (PI), polycaprolactone (PCL), polystyrene (PS), fluorinated polymers, and polymethylmethacrylate (PMMA); and one or more hydrophilic blocks selected from the group consisting of polymethyloxazoline (PMOXA), polyethyloxazoline (PEtOXA), and polyethylene oxide (PEO). In particular embodiments of methods herein, the block copolymer comprises one or more hydrophobic blocks selected from the group consisting of polybutadiene (PB), and polydimethylsiloxane (PDMS); and one or more hydrophilic blocks selected from the group consisting of polymethyloxazoline (PMOXA), and polyethylene oxide (PEO).

In some embodiments of methods included herein, a detergent is selected from the group consisting of octylglucopyranoside (OG), polyethylene glycol p-(1,1,3,3-tetramethylbutyl)-phenyl ether, octylpolyoxyethylene (Octyl-POE), decyl maltoside (DM), and dodecyl maltoside (DDM). In still further embodiments the membrane protein is selected from the group consisting of aquaporins, outer membrane channels, mechanosensitive channels, ATPases, rhodopsins, ABC transporters, G-protein coupled receptors, potassium channels, sodium iodide symporter, and photosynthetic proteins. In some embodiments the membrane protein is selected from the group consisting of AQP0, AQP1, AqpZ, AQP4, SoPIP2; 1, NtAQP1, AQP9, AqpX, OmpF, OmpA, OmpC, FhuA, an MscL, an ATPase, a rhodopsin, a bacteriorhodopsin, a halorhodopsin, a channel rhodopsin, NIS, PSI, and PSII.

In some embodiments the slow, controlled detergent removal is through a method selected from the group consisting of dialysis, biobeads, dilution and cylclodextrin removal. In particular embodiments the slow, controlled removal is conducted through dialysis, and wherein the dialysis is conducted with a dialysis buffer selected from the group consisting of MES, HEPES, Citrate, PBS, and TRIS. In some embodiments detergent removal is through dialysis conducted at a controlled rate by including detergent in a dialysis buffer at the beginning of dialysis and gradually diluting the dialysis buffer. Detergent may be removed, for example, at a rate of 0.1 mg per ml per day to 100 mg per ml per day.

Other embodiments provide a high density membrane protein membrane, including at least one block copolymer and at least one membrane protein, wherein the molar ratio of polymer to protein is selected from the group consisting of less than 100, less than 75, less than 50, less than 40, less than 25, less than 20, less than 15, less than 10, less than 5, and less than 1. In some embodiments the ratio of polymer to protein is less than 40. In other embodiments the ratio of polymer to protein is less than 1.

In some embodiments of the membrane, the at least one block copolymer is a diblock or triblock amphiphilic copolymer comprising at least one hydrophobic block selected from the group consisting of polybutadiene (PB), and polydimethylsiloxane (PDMS); and at least one hydrophilic block selected from the group consisting of polymethyloxazoline (PMOXA), and polyethylene oxide (PEO). In further embodiments of a high density membrane protein membrane, the at least one membrane protein is selected from the group consisting of an aquaporin, an outer membrane channel, a rhodopsin, and a photosynthetic protein. The high density membrane protein membrane may be, for example, a planar membrane. In another embodiment the membrane is a two-dimensional crystal membrane.

BRIEF DESCRIPTION OF THE SEVERAL VIEW OF THE DRAWINGS

FIG. 1A through FIG. 1C show that morphology of BCP-AQP0 aggregates depends on the AQP0 volume fraction. The transitions between different morphologies of BCP-protein aggregates are compared with those of lipid (DOPE)-protein aggregates for one complete data set (Table 2).

FIG. 1A shows a plot of molar PoPRs against morphology transitions. N: native structures; V: vesicles; M: planar membranes; C: 2D crystals. FIG. 1B shows a plot for the same data set of transitions between aggregate morphologies against the calculated AQP0 volume fraction. The transition for diblock copolymers, triblock copolymers and the lipid investigated in this study occur at similar hydrophilic volume ratios. All studied amphiphiles transitioned to vesicular structures at an AQP0 volume fraction of 16% or higher (solid gray line) and to planar membranes at an AQP0 volume fraction of 65% or higher (dashed line).

FIG. 1C shows a plot for the same data set of the transitions between aggregate morphologies, in which the MW of the "aggregate unit" is plotted against the calculated AQP0 volume fraction. The values for the MW of the aggregate unit, the MW of one polymer or lipid molecule with the associated fraction of the MW of AQP0, were calculated by adding the MW of a lipid or polymer molecule to the fraction of the MW of AQP0 associated with the lipid or polymer based on the LPR or PoPR, respectively. The lines indicate the approximate transition boundaries.

Figure 2B:
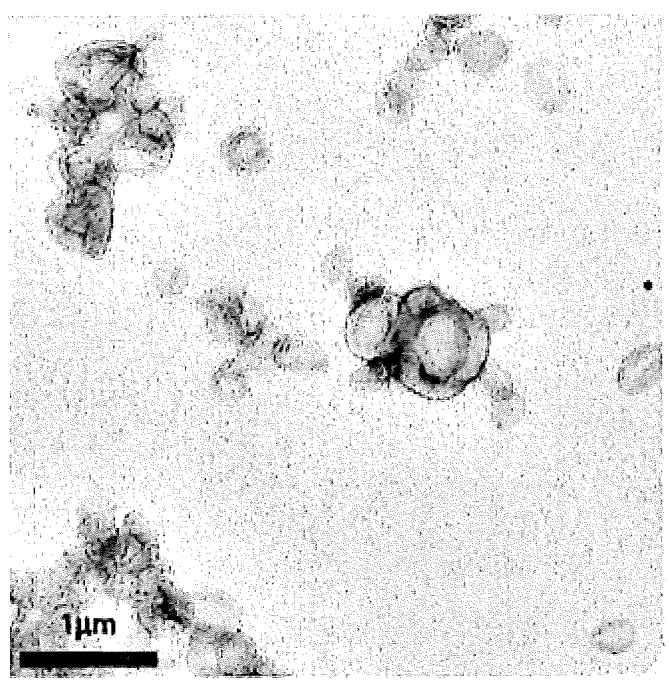
Figure 2C:
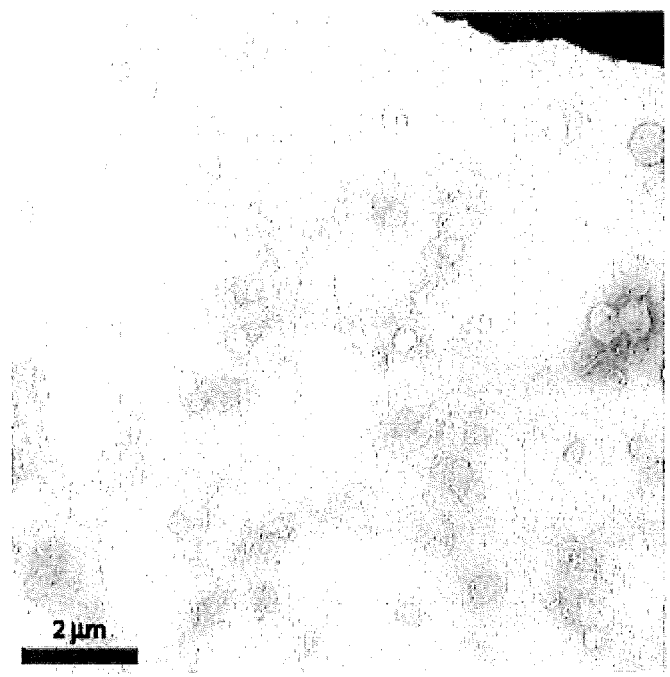
Figure 2D:
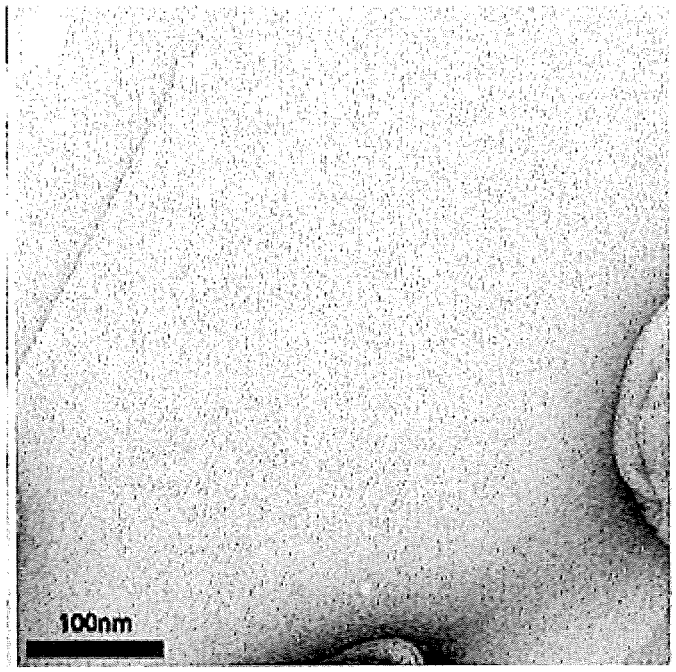

FIG. 2A though FIG. 2D show a morphological transition of DOPE membranes with increasing AQP0 concentrations. FIG. 2A shows that in the absence of protein, DOPE forms vesicles. FIG. 2B shows that at a molar LPR of 50, the membranes remain vesicular but increase in size. FIG. 2C shows that at a molar LPR of 13.3, planar membranes begin to form. FIG. 2D shows that at a molar LPR of 12.5, AQP0 forms crystalline arrays in planar DOPE membranes.

Figure 3:
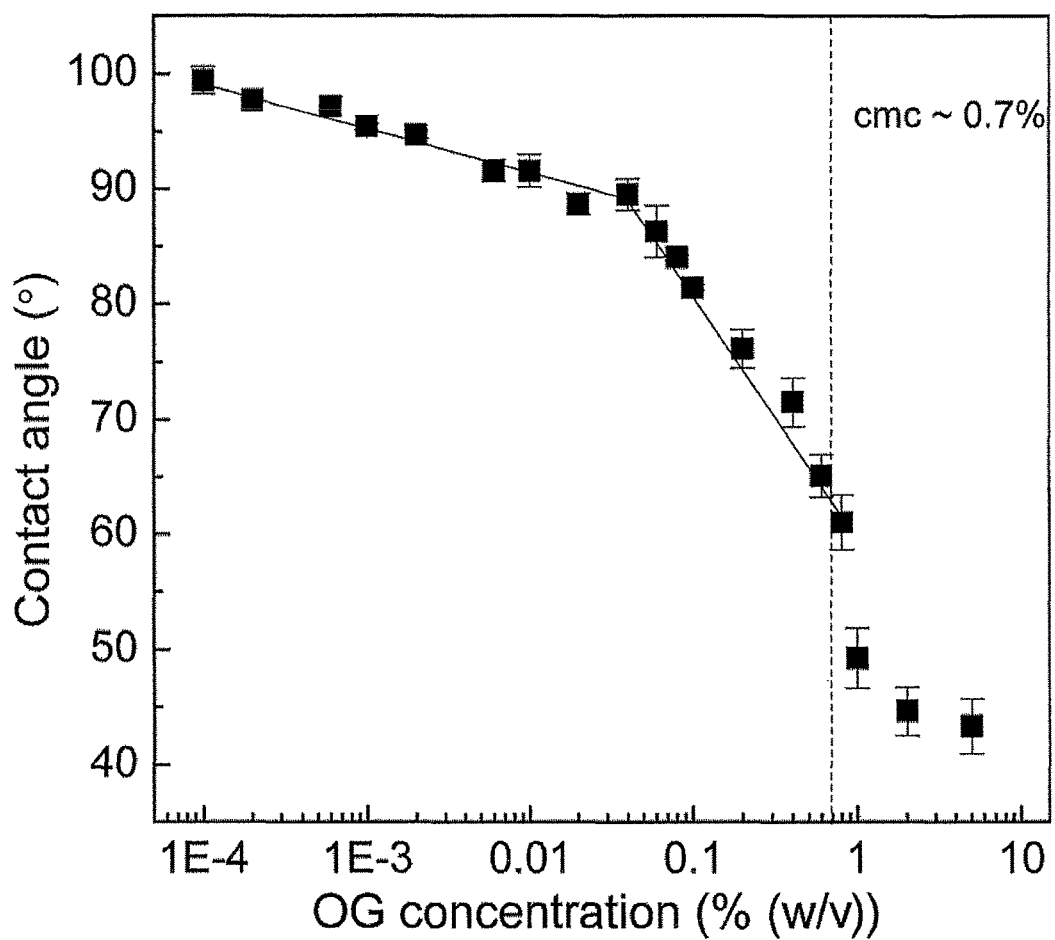

FIG. 3 shows a calibration curve determined with PB12 vesicle solutions containing known OG concentrations and used to convert measured contact angles to OG concentrations. The contact angle method can only be used to measure the concentration of a detergent below its cmc (~0.7% for OG). Detergent concentrations above the cmc were therefore measured by first diluting the sample with detergent-free buffer.

Figures 4A, 4B:
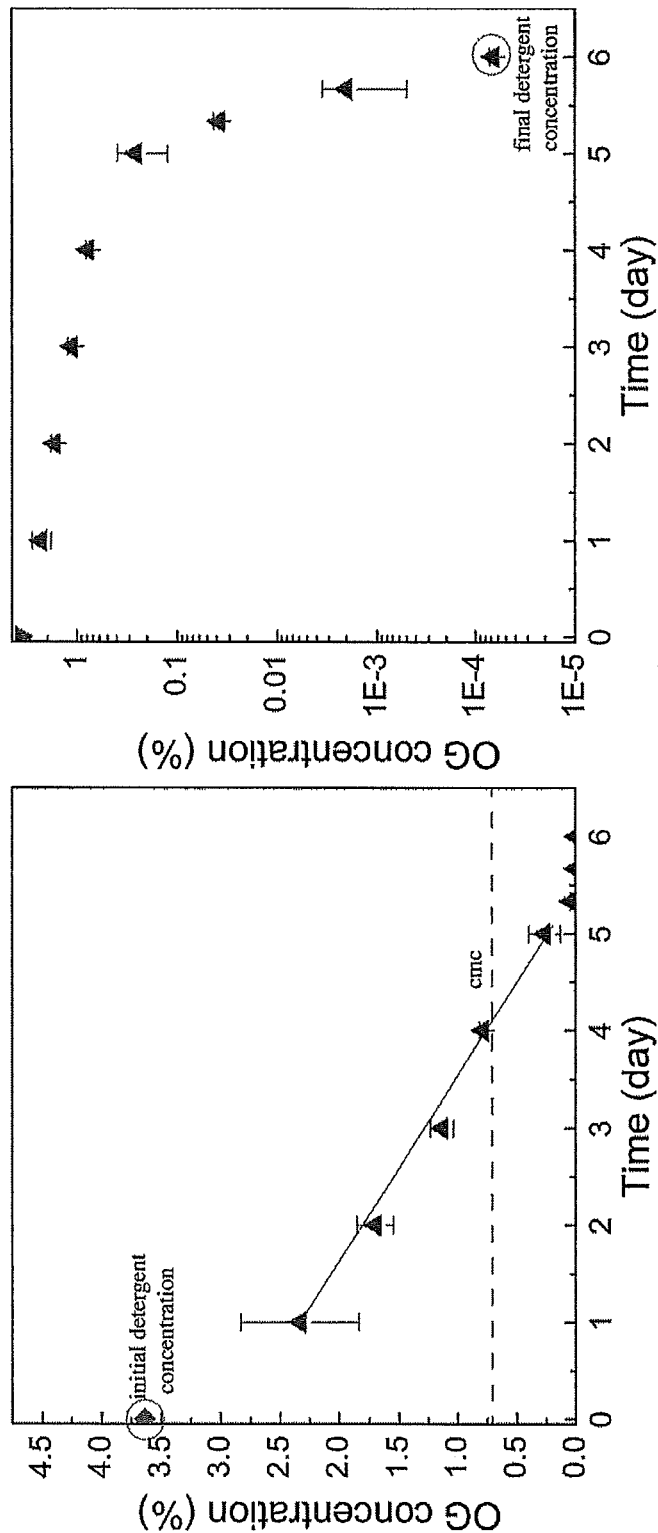

FIG. 4A through FIG. 4B show detergent removal over time by using slow, controlled dialysis for detergent removal. The initial detergent concentration was measured as 3.7% (red circle). In FIG. 4A, the slope of the blue line represents the detergent removal rate when the system passes through the cmc of the detergent (OG; ~0.7%). As the concentration of the detergent solubilizing the protein and the polymer approaches its cmc, a transition is expected to occur from mixed micelles to higher-order structures such as vesicles. The detergent removal rate during this transition was used to describe the characteristic detergent removal rate for a given dialysis procedure. This choice is relevant to the current study, because the transition region in which mixed micelles begin to convert to higher-order structures has been shown to affect the morphology of the resulting aggregates. With slow detergent removal, the rate was 5.1 mg/ml/day. FIG. 4B shows the same data as in FIG. 4A shown on a log scale to highlight the final detergent concentration at the end of the dialysis procedure used, which was ~0.0001% (red circle).

Figure 5:
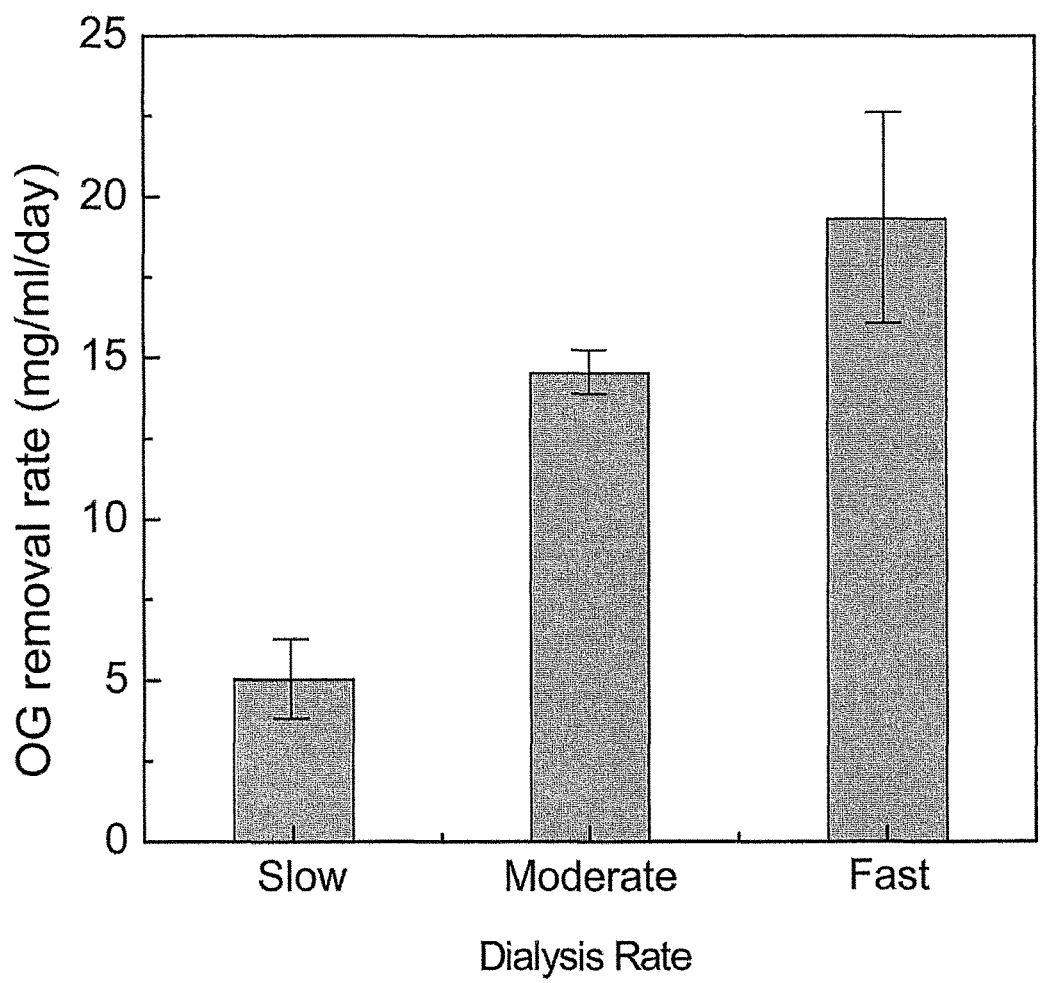

FIG. 5 shows critical detergent removal rates, defined as the detergent removal rate as the system transitions through the cmc of the detergent, for the three used protocols were 5.1 mg/ml/day for slow dialysis, 14.6 mg/ml/day for moderately fast dialysis and 19.4 mg/ml/day for fast dialysis. All dialyses were conducted at 4° C.

Figure 6A:
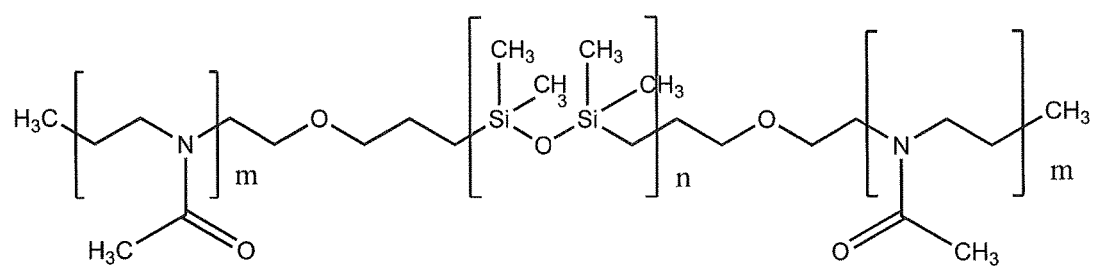
Figure 6B:
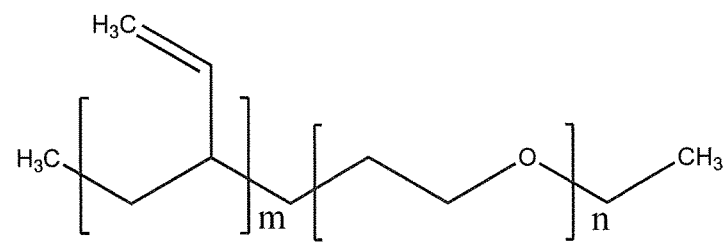

FIG. 6A and FIG. 6B show polymer structures. FIG. 6A shows PMOXA-PDMS-PMOXA. FIG. 6B shows PEO-PB.

Figure 7A:
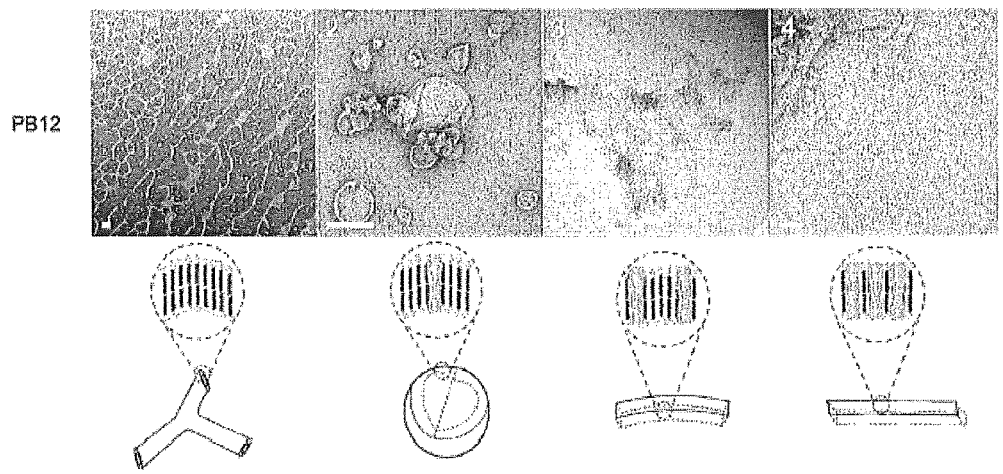
Figure 7B:
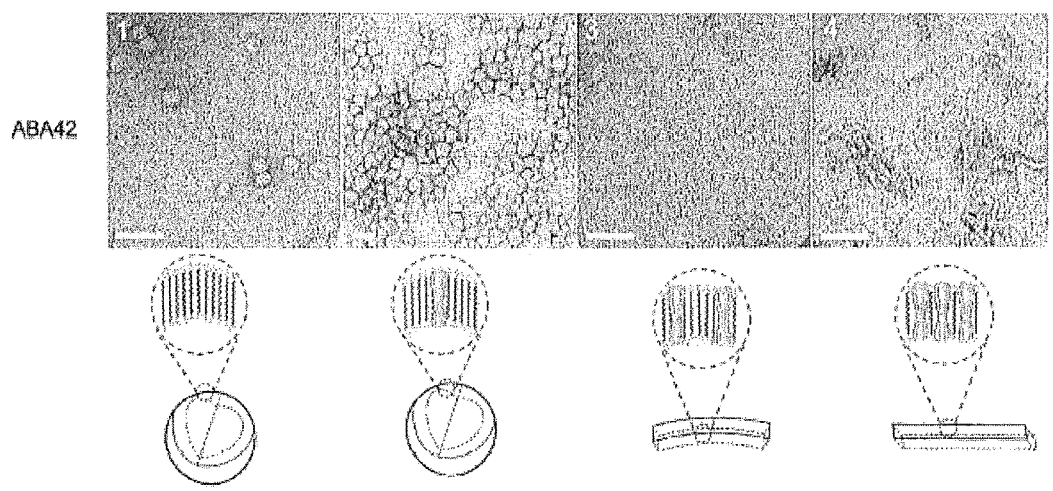

FIG. 7A (parts 1-4) and FIG. 7B (parts 1-4) show that the membrane protein concentration has a large effect on the morphology of the resulting self-assembled membrane protein-block copolymer aggregate. The micrographs show polymer-to-protein ratios (PoPRs) that are representative of the range in which a particular aggregate morphology is dominant. FIG. 7A shows reconstitution of AQP0 with PB12 at molar PoPRs of (1) ∞(no protein), (2) 15.5, (3) 3.9, and (4) 1.3. The increase in incorporated protein leads to a transition from the network structures formed by pure polymer to a mixture of network structures and vesicles (shown in FIG. 8A), to vesicles only, membranes, and finally to crystalline membrane patches. FIG. 7B shows reconstitution of AQP0 with ABA42 at PoPRs of (1) ∞(no protein), (2) 43.2, (3) 2.2, and (4) 0.6. The aggregates transition from vesicles only, to larger vesicles, to membranes, and finally to crystalline membrane patches. Schematics below each panel show the presumed arrangement of polymer bilayers (for PB12) or monolayers (for ABA42) and the location of AQP0 in the formed membranes. Scale bars at the bottom of each figure are 100 nm.

Figure 8A:
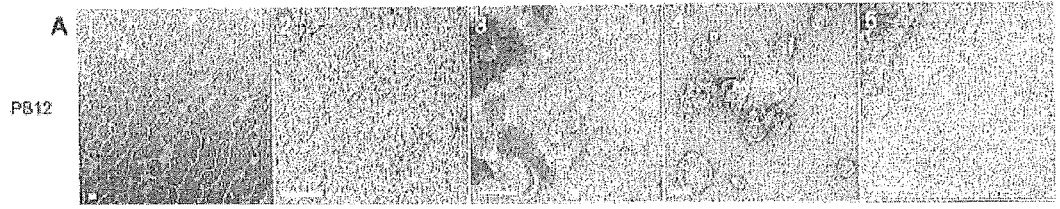
Figure 8B:
Figure 8C:
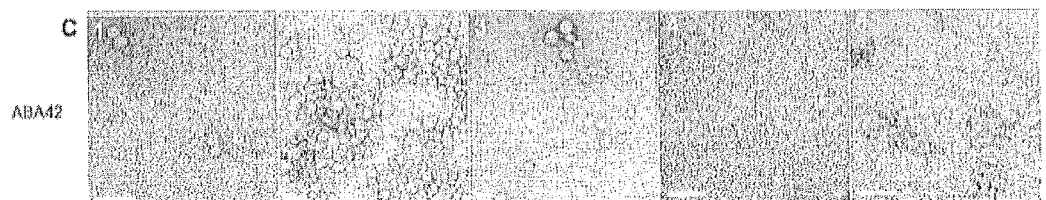
Figure 8D:
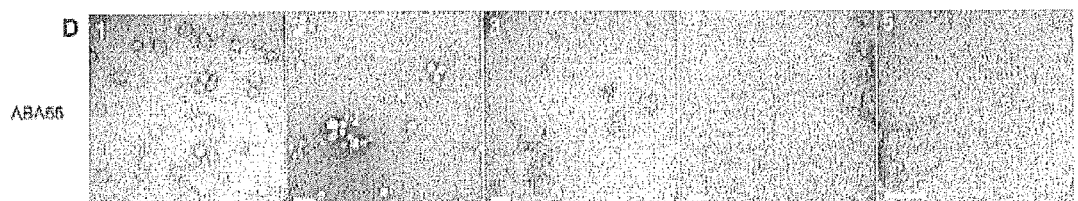

FIG. 8A through FIG. 8D show the effect of increasing protein concentrations (decreasing PoPRs) on aggregate morphology for all block copolymers tested. The micrographs show PoPRs that are representative of the range in which a particular aggregate morphology is dominant. FIG. 8A shows reconstitution of AQP0 with PB12 at molar PoPRs of (1) ∞(no protein), (2) 258, (3) 51, (4) 15.5, and (5) 1.3. The increase in incorporated protein leads to a transition from the network structures formed by pure polymer described before, to a mixture of network structures and vesicles, to vesicles only, and finally to crystalline membrane patches. FIG. 8B shows reconstitution of AQP0 with PB22 at PoPRs of (1) ∞(no protein), (2) 156, (3) 31, (4) 9.3, and (5) 1.6. With increasing protein incorporation, the aggregates transition from a mixture of small vesicles and vesicles with attached tubes, to a mixture of membrane patches and vesicles, and finally to membrane patches only. FIG. 8C shows reconstitution of AQP0 with ABA42 at PoPRs of (1) ∞(no protein), (2) 43.2, (3) 8.6, (4) 2.2, and (5) 0.6. The aggregates transition from vesicles only, to a mixture of membrane patches and vesicles, to only membrane patches, and finally to crystalline membrane patches. FIG. 8D shows reconstitution of AQP0 with ABA55 at PoPRs of (1) ∞(no protein), (2) 46, (3) 9.2, (4) 2.8, and (5) 1.5. There is a transition from vesicles only to a mixture of membrane patches and vesicles, to membrane patches only. All scale bars at the bottom of each figure are 100 nm.

Figure 9:
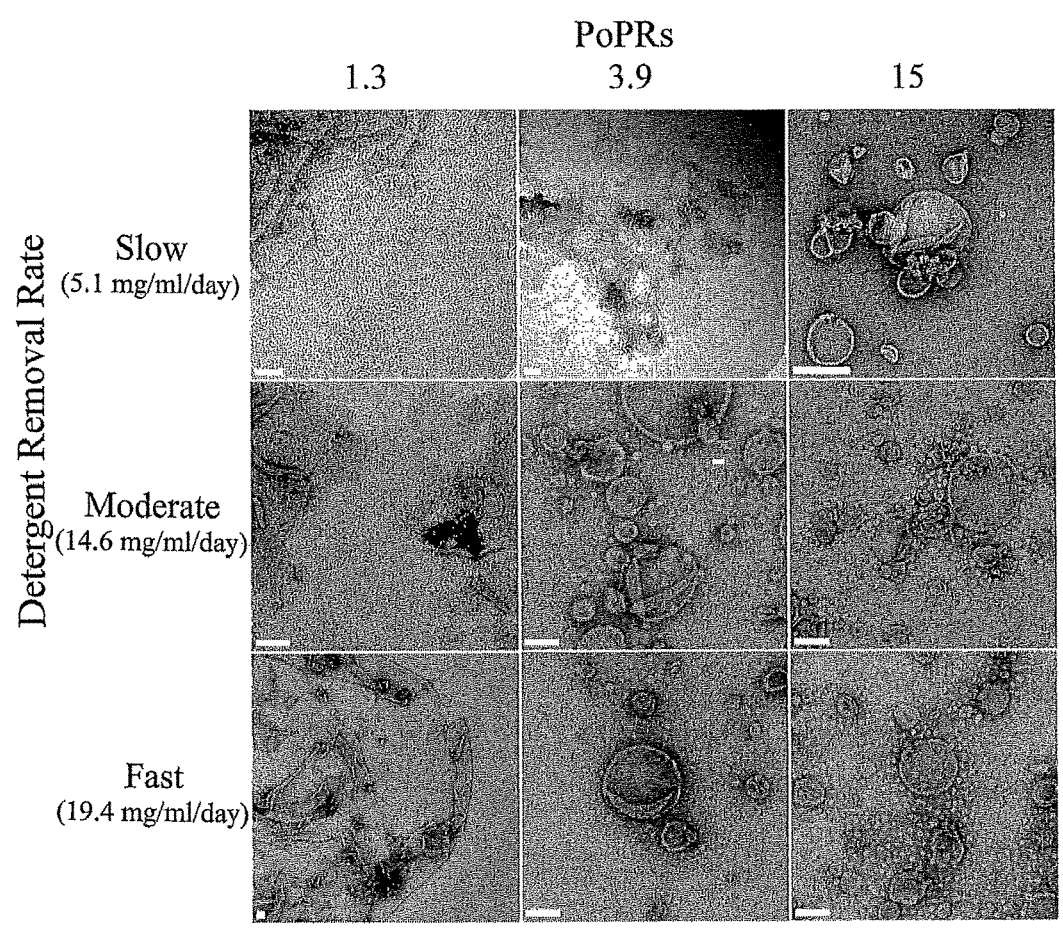

FIG. 9 shows an effect of detergent removal kinetics on PB12-AQP0 aggregate morphology. Compared to the variety of aggregate morphologies that formed at the slow dialysis rate (2D crystals, planar membrane sheets, and vesicles), higher dialysis rates resulted in a preponderance of vesicular structures. In contrast to the slow dialysis protocol, the faster dialysis protocols also resulted in a substantial background of small polymer vesicles or micelles with or without AQP0 (white spots in images), indicating a decrease in efficient incorporation of AQP0 in PB12 membranes.

With the moderate dialysis rate and the low PoPR of 1.3 (at which AQP0 formed 2D crystals with the low dialysis rate), large planar membranes and several collapsed vesicles were seen, which occasionally contained poorly ordered 2D arrays of AQP0. At a PoPR of 3.9, large, non-crystalline vesicles formed, and at a PoPR of 15, again vesicles formed with some small polymer micelles or vesicles visible in the background. With the high dialysis rates, the vesicle size increased with decreasing PoPRs, similar to the tendency seen with the slow dialysis rate we used before. In particular, at the lowest PoPR of 1.3, large, folded membranes formed (non-crystalline), while at higher PoPRs smaller vesicles formed with a large quantity of small polymer vesicles or micelles with or without AQP0 seen in the background (white spots on images). Scale bars at the bottom of each figure are 100 nm.

Figure 10A:
Figure 10A:
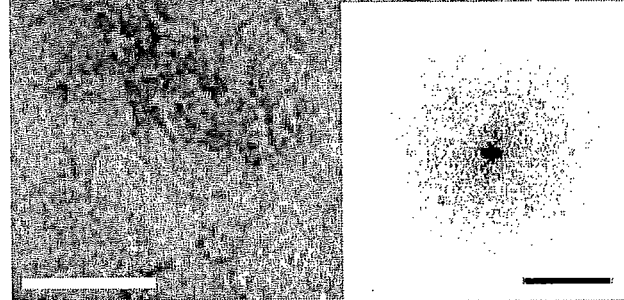
Figure 10B:
Figure 10B:
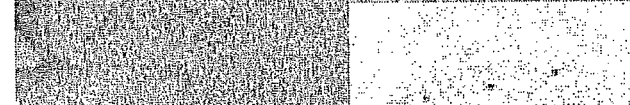
Figure 10B:
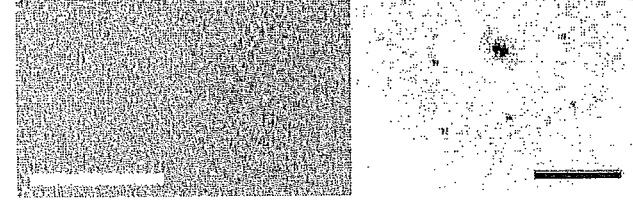

FIG. 10A and FIG. 10B show 2D crystals of AQP0 formed in BCPs. FIG. [[2A]] FIG. 10A shows AQP0 2D crystals in ABA42. FIG. 10B shows AQP0 2D crystals in PB12. The diffraction spots seen in the Fourier transforms of these images after unbending (insets) demonstrate the high degree of protein incorporation. The scale bar in the insets is $(5\ nm)^{-1}$. The unit cell dimensions of a=b=6.5 nm are the same as those of AQP0 2D crystals formed with lipids.

FIG. 11A through FIG. 11B show a comparison of the water permeability of PB12 and PB12-AQP0 vesicles. FIG. 11A shows normalized light scattering traces of PB12 vesicles with (upper curve) and without AQP0 (lower curve) subjected to a 25 mOsm sucrose gradient at pH 6.5. This osmolarity was chosen specifically for this figure to demonstrate the clear difference in kinetics. For actual data collection a 50 mOsm sucrose gradient was used for AQP0-BCP vesicles and a 300 mOsm gradient for pure BCP vesicles. At a gradient of 25 mOsm, the kinetics for PB12 vesicles with AQP0 took ~70 ms to saturate while it took ~500 ms for pure PB12 vesicles. FIG. 11B shows the approximately seven-fold higher water permeability of vesicles containing AQP0 compared to that of pure PB12 vesicles indicates that the incorporated water channels are functional. The error bars represent standard deviation of three measurements. FIG. 11C shows determination of the activation energy (Ea) yielded 12.8 kcal/mol for pure PB12 vesicles (lower curve) and 5.7 kcal/mol for PB12 vesicle with AQP0 (upper curve). The values reported in the text are averages of three independent measurements.

DETAILED DESCRIPTION OF THE INVENTION

Embodiments provide methods for preparing high density membrane protein membranes including membrane protein crystals in block copolymers by slow and controlled removal of detergent. One way to accomplish that slow and controlled removal is through dialysis. Other methods include, for example, but are not limited to use of biobeads, dilution, and cylclodextrin based methods. Membranes created by this method are also provided.

We have found that membrane proteins can be incorporated into amphiphilic BCP membranes at high density. For example, they may be incorporated at levels where molar polymer to protein ratios are around 1 or lower. We have also found that incorporation of membrane proteins affects the morphology of the resulting BCP-membrane protein aggregates. Further, we have found that the methods reported herein permit the creation of two-dimensional protein crystals in BCP membranes. This may allow structure determination of membrane proteins in BCP membranes and investigation of BCP-protein interactions analogous to ongoing studies of lipid-protein interactions.

In preferred embodiments the protein incorporated into the membrane is native or mutant AQP0. Two dimensional ("2D") crystals with thicknesses between 3 and 15 nm prepared according to embodiments of the invention indicate that the structure and organization of AQP0 tetramers in BCP membranes are the same as in lipid-based 2D crystals. The 2D crystals also show that a high density of membrane proteins can be incorporated into BCP membranes with planar architecture, ideal for engineering applications. Finally, functional studies with AQP0 incorporated into BCP vesicles show that, by using the slow and controlled detergent removal approach presented here, it is possible to reconstitute functional membrane proteins into BCP vesicles at packing densities not reported before. General procedures and preferred embodiments are discussed in the following disclosure.

I. Controlled Slow Detergent Removal Greatly Increases the Efficiency (Number of Membrane Proteins Per Unit Area of Membrane) of Membrane Protein Incorporation into BCP Membranes.

Prior attempts at incorporation of membrane protein into BCP membranes have used, for example, film rehydration. The film rehydration method relies on separation of a BCP film from a glass surface to form membranes with simultaneous insertion of membrane proteins. Even though this method has been marginally successful, one study showed that protein insertion is limited to an equivalent PoPR of ~100. In an alternative protein incorporation method, preformed BCP vesicles are destabilized by addition of detergent to allow insertion of detergent-solubilized membrane proteins. This procedure may also limit the number of membrane proteins that can be incorporated, because inserting membrane proteins into preformed membranes is energetically expensive, especially if the hydrophobic region of the membrane protein does not match that of the BCP membrane.

Although dialysis has been used in the reconstitution of membrane proteins into lipid membranes to form either proteoliposomes for functional studies or 2D crystals for structural studies, BCPs were previously believed unsuitable for dialysis and other controlled detergent removal methods (biobeads, dilution and cylclodextrin based methods) for a number of reasons. For example, they are substantially less soluble in detergents than lipids. If a ternary BCP/protein/detergent solution is not well mixed prior to the start of dialysis or if the rate of detergent removal is too high, the polymer can precipitate out of solution and self-assemble by itself without significant membrane protein incorporation.

We have found that substantial dissolution, as evaluated by micelle size using dynamic light scattering or transmission electron microscopy, of the BCP in detergent before mixing it with the detergent-solubilized membrane protein and effecting a slow, controlled detergent removal rate of between 5 and 15 mg/ml/day to allow the ternary BCP/protein/detergent mixture to slowly transition through the cmc (critical micelle concentration) of the detergent results in efficient membrane protein insertion. In further embodiments the slow, controlled detergent removal rate is between 5 and 10 mg/ml/day or between 10 and 15 mg/ml/day. In still further embodiments the detergent removal rate is more than 0 mg/ml/day but less than 5 mg/ml/day, less than 10 mg/ml/day, or less than 15 mg/ml/day.

Membranes created in embodiments of the invention may have one or more of a number of possible applications. For example, they may be useful in medical separations or water purification.

Membranes created may be supported on solid supports. These may include, for example, but are not limited to supports of polymers, gels, or metallic materials.

Typically a method as reported herein includes the preparation of a solution including at least one block copolymer, at least one detergent, and at least one membrane protein. Suitable amphihilic block copolymers include, for example, but are not limited to block copolymers with the following hydrophobic blocks: Polybutadiene (PB), Polyethylethylene (PEE), Polydimethylsiloxane (PDMS), polypropylene (PP), Polypropylene oxide (PPO), Polyisobutylene (PIB), Polyisoprene (PI), Polycaprolactone (PCL), Polystyrene (PS), various fluorinated polymers, and Polymethylmethacrylate (PMMA). The hydrophilic blocks on these polymers could be, for example, polymethyloxazoline (PMOXA), Polyethyloxazoline (PEtOXA), and Polyethylene oxide (PEO).

Embodiments of the invention may include triblock or diblock copolymers.

Any of a variety of detergents may be used for dissolving polymers and stabilizing membrane proteins. For example, the detergent used may be octylglucopyranoside (OG), Triton X100, Octylpolyoxyethylene (Octyl-POE), decyl maltoside (DM), dodecyl maltoside (DDM). In some embodiments a mixture of two or more detergents may be used and hydrophobic polystyrene adsorbent beads (for eg. Biobeads) may be used to enhance removal, particularly removal by dialysis. In some embodiments a skilled artisan who has the benefit of this disclosure may select a detergent based on compatibility with the membrane protein used.

One or more types of membrane proteins may be used depending on the effect that is desired in the final membrane. For example, suitable native, recombinant and engineered membrane proteins may include but are not limited to Aquaporins (including AQP0, AQP1, AqpZ, AQP4, SoPIP2; 1, NtAQP1, AQP9, AqpX), outer membrane channels (OmpF, OmpA, OmpC, and FhuA), mechanosensitive channels (MscLs), ATPases, rhodopsins (bacteriorhodopsins, halorhodopsins, channel rhodopsins), ABC transporters, G-protein coupled receptors, Potassium channels, Sodium iodide Symporter (NIS), and Photosynthetic proteins (PSI, PSII).

In a typical solution the components, including membrane proteins and polymers, are mixed in a ratio of between 0.2 to 100 polymer to protein molar ratio with appropriate detergent. In other embodiments the molar mixture ratio of polymer to protein is between 10 to 100, 10 to 90, 20 to 80, or 30 to 70.

High-density membranes (with molar protein to polymer ratios greater than 0.1) are formed by controlled slow detergent removal. In a preferred embodiment the removal is through dialysis. Typically dialysis is conducted in multiple stages, with each stage including use of a dialysis buffer that has a detergent concentration approximately half that of the prior buffer, until a buffer is used that has no detergent at all. Although any number of iterations may be used, typically 5-10 exchanges are adequate. These parameters effectively vary the dialysis rate as the system crosses the cmc of the detergent, a critical parameter to 2D membrane protein crystal formation. Detergent removal may also be achieved, for example, by using hydrophobic adsorbent beads (for example, Biobeads® brand beads), dilution of the aggregates, or by using methyl β-cyclodextrin.

Various dialysis conditions may be used for detergent removal. Suitable dialysis buffers include but are not limited to MES, HEPES, Citrate, PBS, or TRIS. The buffers may have monovalent ions ($Na^+$, $K^+$ $NH_4^+$, $Cl^-$), divalent ions ($Ca^{2+}$, $Mg^{2+}$), biocide (sodium azide), other salts (for eg. ammonium ferric citrate).

Dialysis may be conducted, for example, at a temperature between 4° C. and 90° C. Also, these temperatures may be ramped at different rates to "anneal" the crystals. Presently a temperature of 4° C. to 37° C. is typically used. Temperatures for detergent removal using methods other than dialysis may vary but are typically also within this range.

In addition to the identity of the buffer and operating temperature, the identity of the dialysis membrane may also be relevant to the membrane formation. The dialysis membrane used is a 12-14 kDa cut off membrane, but other membranes may also be used. For example, one may use dialysis buttons with dialysis membranes, or one may use the same membranes on a flow-through dialysis.

II. The Amount of Incorporated Membrane Protein Affects the Morphology of BCP-Protein Aggregates.

We have found that the amount of incorporated membrane protein affects the morphology of the resulting aggregates. Typically, increasing the amount of membrane protein drives the resulting aggregate morphology. The membrane protein concentration and the kinetics of detergent removal determine the morphology of the aggregate formed. This morphology may be, for example, network structures, vesicles, membranes, or crystals.

In various embodiments the morphology of self-assembled aggregates formed by pure BCPs has been correlated with the volume ratio of their hydrophilic and hydrophobic blocks. This dependence has been attributed to BCP molecules with different hydrophilic volume ratios having different shapes and symmetries in solution based on the volumes occupied by each block. For example, wedge-shaped BCPs with hydrophobic blocks that occupy smaller volumes than their hydrophilic blocks form aggregates with spherical morphologies in aqueous solutions.

On the other hand, rod-shaped BCPs with hydrophilic and hydrophobic blocks that occupy similar volumes, reflected in equal volume fractions for the two blocks, form planar membranes. Inclusion of a molecule that interacts with only the hydrophilic or the hydrophobic block will change the volume fraction of that block, providing a means to control the morphology of the aggregates that form. Nanoparticles that interact with the hydrophilic block have been shown to affect the morphology of resulting BCP structures by increasing the strength of segregation. Simulations and calculations using self-consistent field theory suggested that a large number of membrane proteins could be inserted into BCP membranes, even if the hydrophobic lengths of the membrane protein and the BCP membrane are mismatched, but this prediction had not been experimentally realized.

Increasing the amount of membrane protein incorporated into lipid bilayers can change the morphology of the membranes; for example, morphology may change from vesicles to planar membranes and then to 2D crystals. Here we report similar changes in the morphology of self-assembled BCP structures with an increase in incorporated AQP0. However, the molar polymer to protein ratios (PoPRs) at which the transitions occur seem to span a wide range and are unexpectedly quite different from those seen when membrane proteins are reconstituted into lipid membranes.

Lipid membranes transition from densely packed to 2D crystalline at a molar lipid-to-protein ratio (LPR) in the range of about 8 to 50 (Table 1). When membranes are used with block copolymers as with embodiments of the invention, this transition occurs at a PoPR in the range of about 1.3 and 0.6 for PB12 and ABA42, respectively. These are at least two of the BCPs that undergo this transition. FIG. 1 shows a comparison of the morphological transitions in BCPs with those of a model lipid, dioleoyl phosphatidyletahnolamine (DOPE). The native structure formed by DOPE in the absence of protein is a vesicle. With increasing incorporation of AQP0, vesicles transition into mostly planar membranes at an LPR of ~13, and then to crystals at an LPR of ~12 (Tables 1 and 2), a much tighter transition range than typically seen for embodiments of this invention. Additional DOPE transitions are shown in FIG. 7.

TABLE 1

Molar LPRs for various aquaporin 2D crystals in lipid membranes

| Protein | Lipid | LPR (w/w) | AQP MW | Lipid MW | mLPR | Reference |
|---------|-------|-----------|--------|----------|------|-----------|
| AQP0 | DOPE | 0.35 | 28121 | 744.0 | 13.2 | this document |
| AQP0 | EPL | 0.25 | 28121 | 798.0 | 8.8 | Hite et al, 2010[59] |
| AQP0 | DMPC | 0.25 | 28121 | 677.9 | 10.4 | Gonen et al, 2005[58] |
| AqpZ | DMPC/POPC | 0.35 | 23702 | 719.0 | 11.5 | Ringler et al, 1999[67] |
| AQP1 | EPL | 0.5 | 28526 | 798.0 | 17.9 | Walz et al, 1994[68] |
| AQP9 | DMPC | 0.5 | 31871 | 677.9 | 23.5 | Viadiu et al, 2007[69] |
| AQP2 | EPL | 0.5 | 28837 | 798.0 | 18.1 | Schenk et al, 2005[70] |
| AQP4 | EPL | 1 | 34480 | 798.0 | 43.2 | Hiroaki et al, 2006[71] |

DOPE: 1,2-dioleoyl-sn-glycero-3-phosphoethanolamine,
EPL: E. coli polar lipids,
DMPC: 1,2-dimyristoyl-sn-glycero-3-phosphocholine,
POPC: 1-palmitoyl-2-oleoyl-sn-glycero-3-phosphocholine.

TABLE 2

| mPoPR | Morphology |
|-------|------------|
| PB12 | |
| ∞ (no protein) | N |
| 258.2 | N/V |
| 51 | V |
| 25.82 | V |
| 15.49 | V |
| 7.75 | V |
| 6.45 | V |
| 3.87 | M |

TABLE 2-continued

| mPoPR | Morphology |
|---|---|
| 2.6 | M |
| 1.29 | C |
| 0.52 | C |
| PB22 | |
| ∞ (no protein) | N |
| 778.49 | V |
| 311.39 | V |
| 155.7 | V |
| 31.14 | V/M |
| 15.57 | V/M |
| 9.34 | M/V |
| 7.79 | M/V |
| 3.11 | M |
| 1.56 | M |
| 0.78 | M |
| 0.39 | M |
| ABA42 | |
| ∞ (no protein) | V |
| 43.2 | V |
| 25.9 | V |
| 8.6 | V |
| 4.3 | V/M |
| 2.6 | V/M |
| 2.2 | M |
| 0.9 | M |
| 0.6 | C |
| 0.2 | C |
| ABA55 | |
| ∞ (no protein) | V |
| 46 | V |
| 27.6 | V |
| 9.2 | V/M |
| 2.8 | M |
| 1.5 | M |
| DOPE | |
| ∞ (no protein) | V |
| 200 | V |
| 50 | V |
| 14.2 | M |
| 13.3 | M |
| 12.5 | C |

N = None;
M = Membrane;
V = Vesicle;
C = 2D crystal

The volume fraction of the incorporated AQP0 in the BCP-protein aggregates provides a more consistent basis for understanding morphological transitions for the various BCPs and lipids than PoPRs/LPRs (FIG. 1B). Assuming that the hydrophobic part of AQP0 exerts the predominant effect on the self-assembly of the BCP-protein aggregates, we considered only the hydrophobic volume of the AQP0 molecule, which we estimated from its atomic structure to be 18.91 nm$^3$. This value allowed us to calculate the AQP0 volume fraction in BCP-protein and lipid-protein aggregates (the hydrophilic and hydrophobic volume ratios of the lipid were calculated from the structure of hydrated DOPE molecules). Transitions between different aggregate morphologies seem to occur for all systems at similar AQP0 volume fractions (FIG. 4B).

While the applicant does not wish to be bound by theory, this result may indicate that the morphology of BCP-protein aggregates is driven by segregation of the two blocks of the amphiphilic molecules, which is enhanced by the presence of hydrophobic membrane proteins interacting with the hydrophobic block. FIG. 4B shows clear transitions from one to another dominant morphology in particular AQP0 volume fraction ranges. FIG. 4C shows the same data when the AQP0 volume ratio is plotted against the MW of the aggregate unit (the MW of the polymer or lipid molecule forming the membrane and the associated fraction of the MW of AQP0). Again clear transitions are seen between dominant morphologies in particular AQP0 volume fraction ranges.

The change in morphology of BCP aggregates resulting from different amounts of incorporated protein has relevance for the design of hybrid BCP-protein materials. Furthermore, the unit cell constants of crystalline AQP0 arrays in BCP membranes, which are identical to those in lipid-based AQP0 2D crystals, indicate that the overall structure and organization of AQP0 is maintained in these BCP membranes. The formation of planar BCP membranes rich in structurally and functionally intact membrane protein, which could then be supported on suitable substrates, has applications in many areas.

BCPs may eventually be used to grow 2D crystals of membrane proteins that allow structure determination by electron crystallography. Embodiments provided herein may make possible the growth of AQP0 2D crystals that are sufficiently well ordered to reveal the interaction of BCPs with membrane proteins, just as lipid-based AQP0 2D crystals are currently providing insights into lipid-protein interactions. Furthermore, high-resolution structures of application-relevant membrane proteins in BCP membranes would help to explain similarities and/or differences in the activity seen for membrane proteins incorporated into BCP membranes of different hydrophobic block thicknesses, such as those seen for NADH-ubiquinone oxidase incorporated into BCP membranes. This structural information may allow formulation of principles for the design of materials that optimize membrane protein activity.

III. Functional Membrane Proteins can be Packed into BCP Membranes at High Densities.

In previous studies, full function of aquaporins in BCP membranes has only been demonstrated at low packing densities. The highest packing density showing the expected function was demonstrated for AqpZ reconstituted into a BCP membrane at a molar PoPR (adjusted for triblock architecture) of 100. In embodiments of the invention full protein function still persists at a PoPR of as low as 15. Of course, those of skill in the art will recognize that although the aquaporins are useful for showing various results, embodiments of the invention are not at all limited to use of those proteins.

The possibility of obtaining a high density of functional membrane proteins in BCP membranes has significant implications for applications of such systems. For example, by incorporating the bacterial water channel AqpZ into BCP membranes, a solute-rejecting desalination membrane can be synthesized with a water permeability that is two orders of magnitude higher than that of current membranes used for this purpose. These BCP-AqpZ membranes may be obtained with an equivalent PoPR of 100. In embodiments of the invention, BCP-AqpZ membranes could be made at a PoPR of 15. The water permeability of such a membrane would be expected to be almost three orders of magnitude higher than that of commercial membranes currently available. If the crystalline water channel arrays were functional, which we expect because 2D crystalline AQP1 in a lipid bilayer was shown to be functional, and could be cast in a useful matrix, then the water permeability would increase by another order of magnitude. In other embodiments the BCP-protein membranes may be made with PoPR between 10-100, between 10-50, between 10-20, or 15.

Examples

The examples presented below describe the creation of block copolymer membranes incorporating AQP0 proteins. Those of skill in the art will recognize that these methods may also be used for other proteins and other block copolymers.

Materials and Methods

Polymers.

PMOXA-PDMS-PMOXA polymers were synthesized as in Nardin, C.; Hirt, T.; Leukel, J.; Meier, W. *Langmuir* 2000, 16, 1035-1041 with the modifications described in Kumar, M.; Grzelakowski, M; Zilles, J.; Clark, M.; Meier, W. *Proc Natl Acad Sci USA* 2007, 104, 20719-20724. PB-PEO polymers were obtained from Polymer Source Inc, Canada. DOPE was purchased from Avanti Polar Lipids, Alabastar, A L.

Protein Purification.

AQP0 was purified from sheep eye lenses as described by Gonen, T.; Cheng, Y.; Sliz, P.; Hiroaki, Y.; Fujiyoshi, Y.; Harrison, S. C.; Walz, T. *Nature* 2005, 438, 633-638.

Reconstitution of AQP0 into BCP Membranes.

10 mg of BCPs were dissolved in 2 ml chloroform, which was first evaporated under a stream of nitrogen to form a thin film on the wall of a glass vial. Residual chloroform was removed by placing the vial in vacuum for 2-3 hours. To obtain a solution of BCP in 10% OG, 100 mg of solid OG was added to the vial and then $NaN_3$ solution (targeting 0.01% conc) to a volume of 1 ml. The sample was stirred overnight, and, if the solution remained turbid, sonication was used to dissolve residual BCPs. The sample was finally filtered through a 0.2 μm track-etched Nucleopore filter and stored at 4° C.

To prepare dialysis samples, purified AQP0 (for a final concentration of 1 or 1.5 mg/ml) was mixed with OG-solubilized BCPs to obtain the desired PoPR (ranging from 250 to 0.1), and the sample volume was adjusted to 60 μl with detergent-containing dialysis buffer. After placing the dialysis sample into a 50-μl dialysis button (model HR3-326, Hampton research, Aliso Viejo, Calif.), the button was sealed with dialysis tubing (Spectrapor—12-14 kDa) and placed into dialysis buffer.

Several dialysis conditions were tested to incorporate AQP0 into BCP membranes, including dialysis temperatures of 37° C., room temperature, and 4° C. Various compositions of the reconstitution buffer were screened, but the best results were obtained with 10 mM MES, pH 6, 100 mM NaCl, 50 mM $MgCl_2$, and 0.01% $NaN_3$, a buffer previously used to reconstitute AQP0 into lipid membranes. The detergent removal rate during dialysis was slowed down by including detergent in the initial dialysis buffer, which was gradually reduced by dilution with detergent-free buffer. The best conditions for reproducible incorporation of AQP0 into BCP membranes were dialysis at 4° C. and an initial OG concentration in the dialysis buffer (50 ml) of 4%, which was diluted by half every 12 hours by doubling the dialysis buffer volume with detergent-free buffer until the OG concentration reached 0.25% on the 4th day. On the 5th day the dialysis buffer was exchanged 3 times every 4 hours with detergent-free buffer, and the buttons were then harvested.

We used a contact angle-based approach to follow detergent removal during dialysis. In this method, the contact angle of a detergent solution on a standard surface is measured. To relate the contact angle to the detergent concentration, a calibration curve is used that is obtained with buffer solutions containing known detergent concentrations. To generate the calibration curve, AQP0-PB12 vesicles (PoPR15) were prepared using the slow dialysis method described above, followed by an additional three days of dialysis against detergent-free buffer. An excess of polystyrene hydrophobic detergent absorption beads, Bio-beads® brand beads (capable of removing 10× the initial detergent concentration in the dialysis buttons), was added to the dialysis buffer during the final three days of dialysis to ensure that no significant amount of detergent remained in the dialysis buffer. After harvesting the vesicles, various amounts of OG were added to the vesicles, and these solutions were used to measure the contact angles. FIG. 3 shows the calibration curve obtained for the AQP0/PB12/OG system.

For OG concentrations higher than its critical micelle concentration, cmc (~0.7%), the detergent concentration was determined by first diluting the samples with detergent-free buffer. To follow the removal of detergent by dialysis, buttons were prepared with 60 μl of a solution containing 1 mg/ml AQP0, 0.58 mg/ml PB12 (PoPR of 15) and 3.8% OG. The buttons were then dialyzed using the protocols described above. At various time points during the dialysis, buttons were harvested, and the contact angle of a 10-μl sample was measured, which was converted to the detergent concentration using the calibration curve shown in FIG. 3. The reduction in detergent concentration over time using the standard slow dialysis protocol is shown in FIG. 4. FIG. 5 shows critical detergent removal rates, defined as the detergent removal rate as the system transitions through the cmc of the detergent, for the three used protocols were 5.1 mg/ml/day for slow dialysis, 14.6 mg/ml/day for moderately fast dialysis and 19.4 mg/ml/day for fast dialysis. All dialyses were conducted at 4° C. The contact angle method established that under the chosen conditions the rate was 5.1 mg/ml/day when the detergent concentration reached the cmc of OG, and that the residual OG concentration at the end of the dialysis was ~0.0001%.

To study the water permeability of BCP-AQP0 vesicles, AQP0 was reconstituted with PB12 at a PoPR of 15. The buffer used for dialysis was 10 mM MES, pH 6.5, 100 mM NaCl, 50 mM $MgCl_2$, and 0.01% $NaN_3$. After dialysis, the vesicles were extruded 20 times using 0.2 μm track-etched Nucleopore filters to form unilamellar vesicles and characterized by EM and dynamic light scattering.

Control PB12 vesicles were synthesized using the method reported in Discher, B.; Won, Y.; Ege, D.; Lee, J.; Bates, F.; Discher, D.; Hammer, D. *Science* 1999, 284, 1143-1146. In this method a stock solution of 100 to 500 ml 10 mg/ml PB12 polymer in chloroform was first placed in a glass vial. The chloroform was evaporated in a stream of argon gas while rotating the glass vial to form a thin film. Traces of solvent were removed by placing the vial under vacuum for a minimum of 2 hours. Reconstitution buffer (the same buffer as used for reconstitution of AQP0) with 100 mM sucrose was then added to this film, and the glass vial was gently shaken. Vesicles formed within an hour and were characterized by EM and dynamic light scattering.

Electron Microscopy and Image Processing.

BCP-protein aggregate samples were diluted 10 to 100 times with the dialysis buffer used to produce the aggregates. A 3.5-μl sample was applied to a glow-discharged, carbon-coated copper EM grid and negatively stained with 0.75% uranyl formate as described in Ohi, M.; Li, Y.; Cheng, Y.; Walz, T. *Biol Proced Online* 2004, 6, 23-34. Images were recorded with a Phillips CM10 electron microscope at an acceleration voltage of 100 kV. Images were taken at a magnification of either 5200× or 52,000× on a 1K×1K CCD camera (Gatan). Lattice unbending and Fourier transformation were performed with the 2dx software.

Water Permeability Measurements.

The water permeability of PB12 and PB12-AQP0 vesicles was measured by following the light scattering with a SF-E100 stopped-flow device from KinTek Corporation, Austin, Tex. A 300 mOsm sucrose solution was used for pure PB12 vesicles and a 50 mOsm sucrose solution for PB12-AQP0 vesicles. The sucrose was added to the buffers in which the vesicles were formed. Experiments were performed with three independent vesicle preparations to ensure reproducibility. A minimum of 10 traces were averaged for each experimental condition. Vesicle size was measured using a Viscotek TDA Model 302 dynamic light scattering device, and water permeability was calculated as described in Kumar, M.; Grzelakowski, M; Zilles, J.; Clark, M.; Meier, W. *Proc Natl Acad Sci USA* 2007, 104, 20719-20724.

Calculations

Calculating the Hydrophilic Volume Ratio of BCPs

The hydrophilic volume ratio was calculated using a procedure similar to that reported in Schlaad, H.; Kukula, H.; Smarsly, B.; Antonietti, M.; Pakula, T. *Polymer* 2002, 43, 5321-5328. The molecular mass of the synthesized hydrophilic or hydrophobic block was converted to molecular volume by using the density of the BCP hydrophobic and hydrophilic blocks for pure homopolymers of similar MW obtained from manufacturer's data (Sigma Aldrich). The hydrophilic volume ratio was then calculated by dividing the volume of the hydrophilic block by the sum of the volumes of the hydrophilic and hydrophobic blocks. The densities used and an example for each type of polymer are shown below in Table 3:

TABLE 3

| | Dp | MW g/mol | mass g | density g/cm$^3$ | volume cm$^3$ | $f_{hydrophilic}$ |
|---|---|---|---|---|---|---|
| PB-PEO | | | | | | |
| PB | 22 | 54.1 | $1.98 \times 10^{-21}$ | 0.86 | $2.30 \times 10^{-21}$ | 0.28 |
| PEO | 14 | 44 | $1.02 \times 10^{-21}$ | 1.13 | $9.05 \times 10^{-22}$ | |
| PDMS-PMOXA | | | | | | |
| PDMS | 42 | 74 | $5.16 \times 10^{-21}$ | 0.97 | $5.32 \times 10^{-21}$ | 0.51 |
| PMOXA | 20 | 85 | $2.82 \times 10^{-21}$ | 1 | $2.82 \times 10^{-21}$ | |

Dp: degree of polymerization (number of repeat units per block)

Calculating the Hydrophilic Volume Ratio of DOPE

The hydrophobic and hydrophilic volumes for DOPE were estimated from the mean molecular area of the lipid in a bilayer (65.8 Å$^2$; Ref. 65) and the average position of the hydrophobic/hydrophilic boundary in the hydrated structure of a similar lipid, 1,2-dioleoyl-sn-glycero-3-phosphocholine (DOPC), described in simulations reported by Mashl, R. J.; Scott, H. L.; Subramaniam, S.; Jakobsson, E. *Biophys J* 2001, 81, 3005-3015. The total length of the lipid molecule in this model is 19.8 Å, and the length of the hydrophobic chains up to the position of the phosphate group is 16.0 Å. The volumes approximated with these values are $1.05 \times 10^{-21}$ cm$^3$ for the hydrophobic part and $2.52 \times 10^{-22}$ cm$^3$ for the hydrophilic part of the lipid. The total DOPE volume is thus $1.30 \times 10^{-21}$ cm$^3$ and the hydrophilic volume ratio of DOPE comes to 0.24.

Calculating the Volume Fraction of AQP0 in BCP-Protein and Lipid-Protein Aggregates We determined the total, hydrophobic, and hydrophilic volumes of AQP0 from its atomic structure, using the program Open Structure. The total volume was estimated as $2.89 \times 10^{-20}$ cm$^3$, and the hydrophobic and hydrophilic volumes as $1.89 \times 10^{-20}$ cm$^3$ and $9.96 \times 10^{-21}$ cm$^3$, respectively.

The volume fraction of AQP0 ($f_{AQP0}$) in polymer-protein and lipid-protein aggregates was calculated using the hydrophobic volume of AQP0 and the volumes of the polymers or lipid. First, the molar PoPR or LPR was used to calculate the number of AQP0 molecules (for PoPR or LPR>1) or the fraction of an AQP0 molecule (for PoPR or LPR<1) associated with one polymer or lipid molecule in the aggregate. This number was multiplied with the hydrophobic volume of AQP0 to obtain the hydrophobic volume of AQP0 in an aggregate unit. The total volume of the aggregate unit was then calculated as the sum of the volume of the polymer or lipid added to the hydrophobic AQP0 volume in the aggregate unit. The volume fraction of AQP0 in an aggregate is the hydrophobic AQP0 volume in the aggregate unit divided by the total volume of the aggregate unit.

BCP Testing

We selected two BCPs each from the two systems most commonly used for polymer vesicle formation and membrane protein insertion: polybutadiene-polyethyleneoxide (PB-PEO)-based diblock copolymers and polymethyloxazoline-polydimethylsiloxane (PMOXA-PDMS)-based triblock copolymers. The architectures and block compositions of these polymers are provided in Table 4 and FIG. 6. Table 4 also summarizes the molecular weight (MW) of the chosen BCPs as well as their calculated hydrophilic weight and volume ratios, the fractions of the polymers that are comprised of hydrophilic blocks by weight and volume, respectively.

TABLE 4

| Block copolymers | | | | |
| --- | --- | --- | --- | --- |
| Polymer ID | Block composition | Type | MW (g/mol) | $f_{hydrophilic}$*  (w)/(vol) |
| PB12 | PEO$_{10}$-PB$_{12}$ | Diblock | 1089 | 0.40/0.34 |
| PB22 | PEO$_{14}$-PB$_{22}$ | Diblock | 1806 | 0.34/0.28 |
| ABA42 | PMOXA$_{20}$-PDMS$_{42}$-PMOXA$_{20}$ | Triblock | 6508 | 0.52/0.51 |
| ABA55 | PMOXA$_{12}$-PDMS$_{55}$-PMOXA$_{12}$ | Triblock | 6110 | 0.33/0.33 |

*$f_{hydrophilic}$ (w): hydrophilic weight ratio, $f_{hydrophilic}$ (vol): hydrophilic volume ratio; the calculation of these values is described herein.

While PMOXA-PDMS polymers have previously been shown to incorporate membrane proteins, PB-PEO polymers have not yet been tested for their ability to incorporate membrane proteins. As test protein for incorporation into BCP membranes, we selected the lens-specific water channel aquaporin-0 (AQP0), because it forms regular arrays in the native lens membrane as well as upon reconstitution with various lipids. Lipid membranes with increasing concentrations of reconstituted AQP0 also show a morphological transition from vesicles to planar membranes, and finally to 2D crystals, thus providing an excellent basis for comparison with reconstitution of AQP0 into BCP membranes.

Our studies show that all BCPs tested form vesicular and planar membranes in the presence of specific amounts of AQP0, and also that the amount of incorporated AQP0 strongly influences the morphology of the resulting BCP-AQP0 aggregates. At very high concentrations, AQP0 forms 2D arrays in two of the BCPs, similar to those seen with lipids. Most of the transitions between different membrane morphologies occur at similar volume fraction values of incorporated AQP0 (the fractional volume occupied by AQP0 in the polymer and calculated by considering the membrane-spanning part of AQP0 as a hydrophobic cylinder). We also characterized the function of AQP0 in one of the BCPs and show that its biological function is preserved in BCP membranes even at high packing densities.

AQP0 Incorporation into BCP Membranes.

Complete initial polymer dissolution in detergent and a slow, controlled detergent removal rate were found to be critical for successful incorporation of AQP0 into BCP membranes. The polymers were initially dissolved in various concentrations of octyl-β,D-glucoside (OG) (2%, 4%, 10% and 40%) and dodecyl-β,D-maltoside (DDM) (2% and 10%). Examination by transmission electron microscopy (EM) revealed that all four polymers tested used an OG concentration of at least 10% for complete dissolution. DDM was not used for further experiments as it has a low critical micellar concentration (cmc) and is thus not well suited for removal by dialysis.

For detergent removal by dialysis, various parameters were tested, including ionic strength, pH, and divalent metal ion concentration ($MgCl_2$) of the dialysis buffer as well as temperature. Most efficient and reproducible incorporation of AQP0 into BCP membranes was obtained by performing the dialysis at 4° C. with dialysis buffer (10 mM MES, pH 6, 100 mM NaCl, 50 mM $MgCl_2$, 0.01% $NaN_3$) that initially contained 4% OG. We note that in other embodiments of the invention the salt concentrations may be between 0 and 500 mM, the pH may be between 2 and 12, the divalent metal concentration of the dialysis buffer may be between 0 and 500 mM, and the temperature may be between 0 and 95° C. The metal ion used in the buffer may be, for example, magnesium, calcium, iron, and sodium.

In the course of the dialysis, the detergent concentration was gradually lowered (by doubling the dialysis buffer volume every 12 hours with detergent-free buffer) until it reached 0.25% on the fourth day. On the fifth day the buffer was exchanged with detergent-free buffer three times every four hours, and the dialysis buttons were harvested. OG has a high cmc (0.68% in 100 mM NaCl) and can therefore be rapidly removed by dialysis (a quantitative study showed that the OG concentration was reduced from 11.7% to less than 0.03% in 20 hours at 4° C.). The above procedure thus ensures essentially complete OG removal from the formed BCP-AQP0 aggregates.

Aggregate Morphology at Different Polymer-to-Protein Ratios.

In a systematic study of the dependence of aggregate morphology on the amount of incorporated protein, we reconstituted AQP0 with the four BCPs using a wide range of polymer-to-protein-ratios (PoPRs). For easier comparison, PoPRs of triblock copolymer/AQP0 mixtures are reported as twice the value actually used, as a triblock polymer molecule is equivalent to two lipid or diblock copolymer molecules in a bilayer configuration. We observed that with increasing protein concentration the aggregates transitioned from the native structures, which the polymer forms in the absence of protein (network structures, vesicles with attached tubes, small vesicles), to vesicles (larger, more monodisperse), to mixtures of vesicles and planar membranes, and finally to only planar membranes. With two polymers, PB12 and ABA42, AQP0 organized into 2D crystals at low PoPR values. Because these transitions occurred at different PoPRs for the different BCPs, we chose for presentation in FIG. 7 and FIG. 8. PoPRs at which a particular morphology of the BCP-AQP0 aggregates was dominant. For two polymers, PB12 and ABA42, the transitions are described in the following paragraphs, and for the other two polymers, PB22 and ABA55, data are shown and described herein.

The PB12-AQP0 system showed the strongest transitions with changing PoPRs. In the absence of protein, Jain and Bates reported that several PB-PEO polymers self-assemble into similar network structures. Jain, S.; Bates, F. *Science* 2003, 300, 460-464. Although it was hypothesized in the earlier study that PB-PEO polymers with MWs as low as that of the PB12 polymer studied here do not form such network structures, we found that PB12 also forms network structures, and at a similar weight fraction range (~0.4) of the hydrophilic PEO block (FIG. 7A, panel 1). The concentration of polymers used in our study is much lower (0.1% rather than 1%), and our procedure differs from that used in the Jain and Bates study, in which solid polymers were mixed in deionized water and equilibrated for several days to weeks. Although not wishing to be bound by theory, it is believed that differences may explain why PB12 unexpectedly formed network structures in our experiments.

Upon incorporation of protein, at a PoPR of first ~250 and then ~50, the native network structures evolved into a mixture of network structures and vesicles (FIG. 8). An increase in protein concentration to a PoPR of 15.5 resulted in the formation of exclusively vesicles that were 200-300 nm in diameter (FIG. 7A, panel 2). A further increase in protein concentration to a PoPR of 3.9 led to the formation of planar membrane sheets (FIG. 7A, panel 3), and at a PoPR of 1.3 AQP0 began to form crystalline arrays in the PB12 membranes (FIG. 7A, panel 4). Dialysis at higher detergent removal rates reduced the efficiency of Aqp0 incorporation into PB12 membranes and changed the morphology of the resulting BP12-AQP0 aggregates. This is shown, for example, in FIG. 8.

In the ABA42-AQP0 system, aggregates transitioned with decreasing PoPRs from vesicles only, to vesicles associated with planar membranes, to planar membranes, and finally to crystalline patches. Without protein, ABA42 formed small vesicles (FIG. 7B, panel 1). With the incorporation of protein, at a PoPR of 43.2, larger vesicles formed, and at PoPRs of 8.6 and then 2.2 the native structures evolved into a mixture of vesicles and membrane patches (FIG. 8) and then larger membrane areas (FIG. 7B, panel 3). With a further increase in the incorporated protein, at a PoPR of 0.6, many membrane patches showed crystalline AQP0 arrays (FIG. 7B, panel 4).

FIG. 10 shows enlarged images of the crystalline AQP0 arrays that formed with PB12 at a PoPR of 1.3 and ABA42 at a PoPR of 0.6. Fourier transforms of images of such two-dimensional (2D) arrays provide information about the organization of the proteins in the array. After computational unbending of the crystal lattice with the 2dx software, calculated Fourier transforms of the BCP-AQP0 crystal images revealed clear diffraction spots (FIG. 10, insets) that define a tetragonal unit cell of a=b=6.5 nm. This unit cell is identical to those seen with AQP0 2D crystals produced with lipids, demonstrating that AQP0 tetramers in BCP membranes are organized in the same way as in lipid bilayers.

Functional Characterization of Densely Packed AQP0 in Polymer Vesicles

We used stopped-flow measurements to assess the function of densely packed AQP0 in PB12 membranes. In stopped-flow studies, light scattering or fluorescence quenching is used to monitor the rapid change in vesicle size when vesicles are subjected to an osmotic gradient. This approach has been used extensively to determine the permeability of water channels reconstituted into vesicles. A prerequisite for the use of this method is that the protein is reconstituted into vesicles, and vesicular morphology was therefore confirmed for all samples used in these studies.

With the dialysis procedure described above, all BCPs tested could be used to incorporate AQP0 at a high density. Other detergent removal methods are believed to be similarly effective when conducted in a slow, controlled manner. To determine whether the incorporated water channels were functional, we reconstituted AQP0 with PB12 at a PoPR of 15, which yields large vesicles densely packed with AQP0 (FIG. 7A, panel 2). Proteoliposomes are often used to determine the transmembrane transport characteristics of reconstituted membrane proteins, but not in the case of AQP0. Instead, AQP0 function has been characterized extensively using native vesicles and expression in *Xenopus laevis* oocytes. Water permeability of AQP0 is low ($2.5 \times 10^{-15}$ cm$^3$/s per molecule) compared to that of classical water channels such as AQP1 ($1.17 \times 10$-13 cm$^3$/s) and AqpZ ($1 \times 10$-13 cm$^3$/s). The low water permeability necessitated a high density of AQPs in order to distinguish its permeability over the background permeability of the BCP membranes.

Since dialysis in the absence of AQP0 causes PB12 to form network structures (FIG. 8A, panel 1), this method could not be used to obtain pure PB12 vesicles needed as control to measure the function of AQP0 reconstituted into PB12 vesicles. We therefore used the sucrose rehydration method to form PB12 vesicles, which were confirmed by EM and dynamic light scattering.

At pH 6.5, the water permeability of PB12 vesicles was 189.7±61.3 μm/s (FIG. 11), which is high compared to the measured permeability of other BCP vesicles, 2.5 μm/s for polyethylethylene-polyethylene oxide (PEE$_{37}$-PEO$_{40}$) and 0.7 μm/s for PMOXA$_{15}$-PDMS$_{110}$-PMOXA$_{15}$. The high water permeability of PB12 vesicles, which is in the range of those seen for lipid vesicles (10-150 μm/s), is likely due to its hydrophobic block consisting of only 12 butadiene units, which is small compared to those of the BCPs analyzed before (30-110 hydrophobic repeat units).

Reconstitution of AQP0 at a PoPR of 15 increased the water permeability of the PB12 vesicles to 1409±409.5 μm/s, indicating incorporation of functional AQP0 (FIG. 11B). To rule out the possibility that the increase in water permeability of the AQP0-containing PB12 vesicles is due to residual detergent, we performed permeability measurements of pure PB12 vesicles in the presence of different OG concentrations (FIG. 12). Since the measured water permeability did not change up to an OG concentration of 0.01% and since the residual OG concentration remaining in AQP0-PB12 vesicle samples after dialysis was measured to be only ~0.0001% (FIG. 4), the increase in water permeability must be due to the incorporation of functional AQP0 channels.

Measurement of the water permeability at different temperatures allowed determination of the activation energy. The activation energy of water conduction by pure PB12 vesicles, 13.2±0.9 kcal/mol, is similar to that of vesicles formed by other BCPs and lipids and indicative of passive diffusion of water across the PB12 membrane. Incorporation of AQP0 into the PB12 vesicles lowered the activation energy to 7.6±1.7 kcal/mol (FIG. 11C), comparable to previously determined values for the activation energy of AQP0-mediated water conduction (5 and 6.9 kcal/mol). These results show that AQP0 function is preserved in BCP membranes, even at the high protein density of the vesicles used in this study.

Any documents referenced above are incorporated by reference herein. Their inclusion is not an admission that they are material or that they are otherwise prior art for any purpose. If any information in an incorporated document conflicts with information written out in this disclosure, the information written out in this disclosure controls.

We claim:

1. A method for preparing a block copolymer/protein membrane, comprising:
    preparing a mixture comprising at least one block copolymer, at least one detergent, and at least one membrane protein, wherein said block copolymer is solubilized in the detergent;
    removing the detergent at a slow, controlled rate from said mixture until the concentration of detergent is below the mixture's critical micelle concentration;
    removing additional detergent at a second rate from the mixture; and
    forming a membrane comprising the block copolymer and the membrane protein at high density representing a polymer to protein molar ratio of 0.2-100,
    wherein removal of the detergent is through dialysis conducted at said slow, controlled rate by including detergent in a dialysis buffer at the beginning of dialysis and gradually diluting the dialysis buffer,
    wherein the dialysis conducted at said slow, controlled rate comprises from 5 to 10 stages, wherein each stage includes use of a subsequent dialysis buffer with a lower concentration than the dialysis buffer of the previous stage.

2. The method of claim 1, wherein the mixture has a polymer to protein molar ratio of between 0.2 and 20.

3. The method of claim 1, wherein the detergent concentration is at least 5% wt/volume in said prepared mixture.

4. The method of claim 1, wherein the polymer to protein molar ratio is between 0.2 and 40.

5. The method of claim 1, wherein said block copolymer is an amphiphilic diblock or triblock block copolymer comprising one or more hydrophobic blocks selected from the group consisting of polybutadiene, polydimethylsiloxane, polypropylene, polypropylene oxide, polyethylethylene, polyisobutylene, polyisoprene, polycaprolactone, polystyrene, fluorinated polymers, and polymethylmethacrylate; and one or more hydrophilic blocks selected from the group consisting of polymethyloxazoline, polyethyloxazoline, and polyethylene oxide.

6. The method of claim 5, wherein said block copolymer comprises one or more hydrophobic blocks selected from the group consisting of polybutadiene and polydimethylsiloxane; and one or more hydrophilic blocks selected from the group consisting of polymethyloxazoline and polyethylene oxide.

7. The method of claim 1, wherein said detergent is selected from the group consisting of octylglucopyranoside, polyethylene glycol p-(1,1,3,3-tetramethylbutyl)-phenyl ether, octylpolyoxyethylene, decyl maltoside, and dodecyl maltoside.

8. The method of claim 1, wherein said membrane protein is selected from the group consisting of aquaporins, outer membrane channels, mechanosensitive channels, ATPases, rhodopsins, ABC transporters, G-protein coupled receptors, potassium channels, sodium iodide symporter, and photosynthetic proteins.

9. The method of claim 8, wherein said membrane protein is selected from the group consisting of AQP0, AQP1, AqpZ, AQP4, SoPIP2;1, NtAQP1, AQP9, AqpX, OmpF, OmpA, OmpC, FhuA, an MscL, an ATPase, a rhodopsin, a bacteriorhodopsin, a halorhodopsin, a channel rhodopsin, NIS, PSI, and PSII.

10. The method of claim 1, wherein the dialysis is conducted with a dialysis buffer selected from the group consisting of MES, HEPES, Citrate, PBS, and TRIS.

11. The method of claim 1, wherein said slow, controlled rate is from 0.1 mg per ml per day to 100 mg per ml per day.

12. A method for preparing a block copolymer/protein membrane, comprising:
preparing a mixture comprising at least one block copolymer, at least one detergent, and at least one membrane protein, wherein said block copolymer is solubilized in the detergent;
removing the detergent at a slow, controlled rate from said mixture until the concentration of detergent is below the mixture's critical micelle concentration;
removing additional detergent at a second rate from the mixture; and
forming a membrane comprising the block copolymer and the membrane protein at high density representing a polymer to protein molar ratio of 0.2-100,
wherein removal of the detergent is through dialysis conducted at said slow, controlled rate by including detergent in a dialysis buffer at the beginning of dialysis and gradually diluting the dialysis buffer,
wherein gradually diluting the dialysis buffer comprises increasing the volume of the dialysis buffer with a second dialysis buffer, wherein the second dialysis buffer is detergent-free or comprises a lower concentration of detergent than the dialysis buffer,
increasing the volume of the dialysis buffer with a third dialysis buffer after increasing the volume of the dialysis buffer with the second dialysis buffer, wherein the third dialysis buffer is detergent-free or comprises a lower concentration of detergent than the dialysis buffer after the volume was increased by the second dialysis buffer, and
replacing the dialysis buffer with detergent-free buffer three times after increasing the volume of the dialysis buffer with said third dialysis buffer.

13. The method of claim 12, wherein the detergent concentration is at least 5% wt/volume in said prepared mixture.

14. The method of claim 12, wherein said block copolymer is an amphiphilic diblock or triblock block copolymer comprising one or more hydrophobic blocks selected from the group consisting of polybutadiene, polydimethylsiloxane, polypropylene, polypropylene oxide, polyethylethylene, polyisobutylene, polyisoprene, polycaprolactone, polystyrene, fluorinated polymers, and polymethylmethacrylate; and one or more hydrophilic blocks selected from the group consisting of polymethyloxazoline, polyethyloxazoline, and polyethylene oxide.

15. The method of claim 14, wherein said block copolymer comprises one or more hydrophobic blocks selected from the group consisting of polybutadiene and polydimethylsiloxane; and one or more hydrophilic blocks selected from the group consisting of polymethyloxazoline, and polyethylene oxide.

16. The method of claim 12, wherein said detergent is selected from the group consisting of octylglucopyranoside, polyethylene glycol p-(1,1,3,3-tetramethylbutyl)-phenyl ether, octylpolyoxyethylene, decyl maltoside, and dodecyl maltoside.

17. The method of claim 12, wherein said membrane protein is selected from the group consisting of aquaporins, outer membrane channels, mechanosensitive channels, ATPases, rhodopsins, ABC transporters, G-protein coupled receptors, potassium channels, sodium iodide symporter, and photosynthetic proteins.

18. The method of claim 17, wherein said membrane protein is selected from the group consisting of AQPO, AQPI, AqpZ, AQP4, SoPIP2;1, NtAQPI, AQP9, AqpX, OmpF, OmpA, OmpC, FhuA, an MscL, an ATPase, a rhodopsin, a bacteriorhodopsin, a halorhodopsin, a channel rhodopsin, NIS, PSI, and PSII.

19. The method of claim 18, wherein the dialysis is conducted with a dialysis buffer selected from the group consisting of MES, HEPES, Citrate, PBS, and TRIS.

20. The method of claim 1, wherein said slow, controlled rate is from 0.1 mg per ml per day to 100 mg per ml per day.

* * * * *